United States Patent
Halimi

(10) Patent No.: US 12,029,172 B1
(45) Date of Patent: Jul. 9, 2024

(54) WATER CONTROL DEVICE FOR AGRICULTURE

(71) Applicant: Henry M. Halimi, Los Angeles, CA (US)

(72) Inventor: Henry M. Halimi, Los Angeles, CA (US)

(73) Assignee: Lumo, Inc., Santa Rosa, CA (US)

(*) Notice: Subject to any disclaimer, the term of this patent is extended or adjusted under 35 U.S.C. 154(b) by 0 days.

(21) Appl. No.: 18/404,894

(22) Filed: Jan. 5, 2024

Related U.S. Application Data

(60) Provisional application No. 63/478,926, filed on Jan. 7, 2023.

(51) Int. Cl.
*A01G 25/16* (2006.01)
*F16K 7/12* (2006.01)
*F16K 7/17* (2006.01)

(52) U.S. Cl.
CPC ............ *A01G 25/16* (2013.01); *F16K 7/126* (2013.01); *F16K 7/17* (2013.01)

(58) Field of Classification Search
CPC ............ A01G 25/16; F16K 7/126; F16K 7/17
USPC ............ 239/67, 69, 70, 201–207, 569; 251/30.02, 30.03
See application file for complete search history.

(56) References Cited

U.S. PATENT DOCUMENTS

| | | | |
|---|---|---|---|
| 4,418,712 A | 12/1983 | Braley | |
| 4,546,671 A | 10/1985 | Fry | |
| 5,038,268 A | 8/1991 | Krause | |
| 5,038,821 A | 8/1991 | Maget | |
| 5,074,468 A * | 12/1991 | Yamamoto | A01G 25/16 239/69 |
| 5,660,198 A | 8/1997 | McClaran | |
| 5,821,636 A | 10/1998 | Baker | |
| 5,927,400 A | 7/1999 | Bononi et al. | |
| 5,971,011 A | 10/1999 | Price | |
| 6,016,836 A * | 1/2000 | Brunkhardt | F16K 31/402 239/69 |
| 6,539,968 B1 | 4/2003 | White et al. | |
| 6,749,136 B1 * | 6/2004 | Wilson | B05B 12/04 239/569 |
| 6,789,411 B2 | 9/2004 | Roy | |
| 6,963,808 B1 | 11/2005 | Addink et al. | |
| 6,994,309 B2 | 2/2006 | Fernandez-Sein | |
| 7,119,698 B2 | 10/2006 | Schleich et al. | |

(Continued)

*Primary Examiner* — Steven J Ganey
(74) *Attorney, Agent, or Firm* — Orbit IP

(57) ABSTRACT

A water control device includes a valve pipe section with an inlet, an outlet and a lower diaphragm valve housing with an internally disposed fluid aperture. An upper diaphragm valve housing includes an extension with an adjustment screw opening for a flow adjustment screw. A diaphragm valve assembly seals and unseals to the fluid aperture by an electric motor driven mechanical actuation fluid pressure diverter assembly. The flow adjustment screw includes a tamper proof surface that can be engaged by a flow adjustment tool. A base structure and cover protect sensitive components and are removable via a cover nut that also has a tamper proof surface. A flow turbine assembly is also removably disposed within the valve pipe section. The entire water control device can be removed and replaced through the use of pipe stub fittings using connecting nuts to engage the inlet and outlet of the valve pipe section.

30 Claims, 22 Drawing Sheets

(56) References Cited

U.S. PATENT DOCUMENTS

| | | |
|---|---|---|
| 7,304,587 B2 | 12/2007 | Boaz |
| 7,317,404 B2 | 1/2008 | Cumeralto et al. |
| 7,330,796 B2 | 2/2008 | Addink et al. |
| 7,360,413 B2 | 4/2008 | Jeffries et al. |
| 7,383,721 B2 | 6/2008 | Parsons et al. |
| 7,426,875 B1 | 9/2008 | McMillan |
| 7,920,983 B1 | 4/2011 | Peleg et al. |
| 7,966,099 B2 | 6/2011 | Fima |
| 7,969,318 B2 | 6/2011 | White et al. |
| 8,347,427 B2 | 1/2013 | Klicpera |
| 8,701,703 B2 | 4/2014 | Scott et al. |
| 8,740,177 B2 * | 6/2014 | Walker ............... F16K 7/17 251/30.02 |
| 8,887,324 B2 | 11/2014 | Klicpera |
| 9,019,120 B2 | 4/2015 | Broniak et al. |
| 9,266,136 B2 | 2/2016 | Klicpera |
| 9,297,150 B2 | 3/2016 | Klicpera |
| 9,494,480 B2 | 11/2016 | Klicpera |
| 9,749,792 B2 | 8/2017 | Klicpera |
| 9,857,805 B2 | 1/2018 | Halimi |
| 2005/0016592 A1 | 1/2005 | Jeromson et al. |
| 2006/0028355 A1 | 2/2006 | Patterson et al. |
| 2011/0303311 A1 | 12/2011 | Klicpera |
| 2014/0130878 A1 | 5/2014 | Marinez |

\* cited by examiner

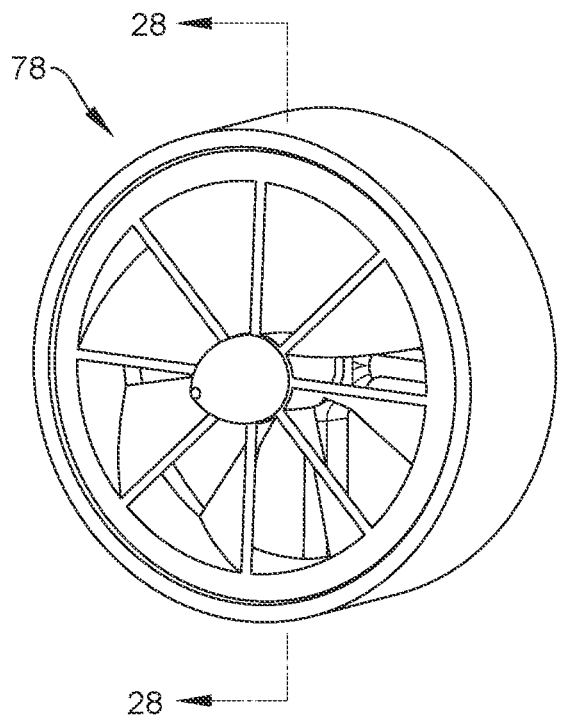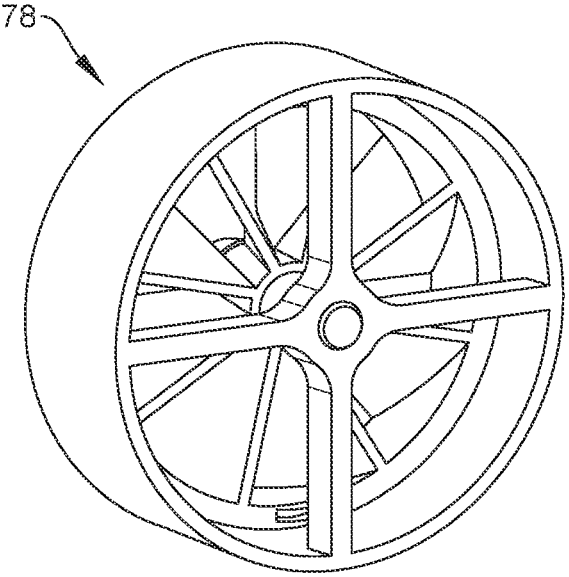
FIG. 25  FIG. 26
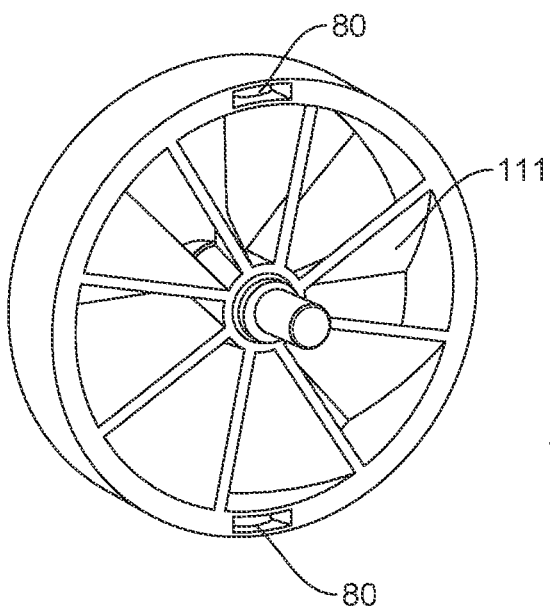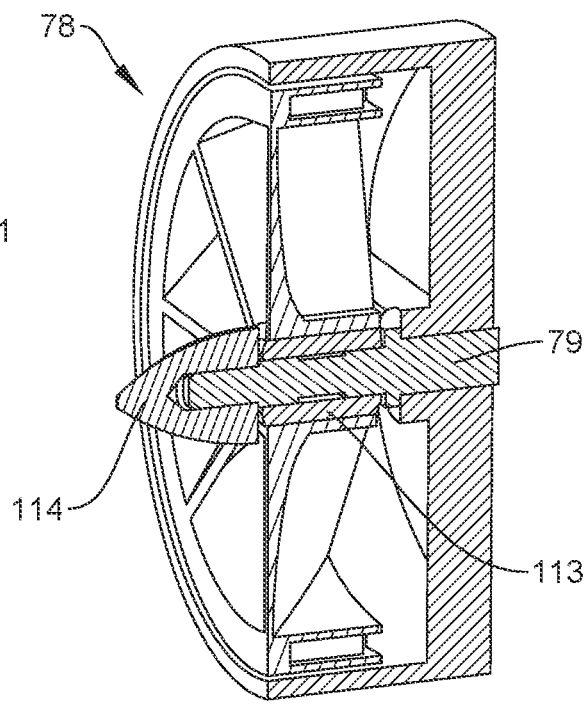
FIG. 27  FIG. 28

WATER CONTROL DEVICE FOR AGRICULTURE

CROSS-REFERENCE TO RELATED APPLICATIONS

This application claims priority to provisional application 63/478,926 filed on Jan. 7, 2023, the entire contents of which are hereby incorporated in full by this reference.

DESCRIPTION

Field of the Invention

The present invention generally relates to water flow control. More particularly, the present invention relates to a water flow and control device that is designed for use in agriculture.

Background of the Invention

Despite recent technological advances with the Internet of Things, where almost all electronic home devices are getting smarter and more capable with wireless connections and associated software, the agricultural field has lagged. For example, it is still common for farmers and/or workers to manually turn on and off the irrigation valves on a daily or a regular basis to water their crops, such as grapes in vineyards, almonds, pistachios, etc. However, many times such farmers or their workers either forget to turn on or forget to turn off these valves according to watering schedules resulting in overwatering or underwatering. Such manual control also requires that the farmer/worker be on site each time such watering is needed and most importantly these operations can only take place during the day. There are many advantages to night watering such as reduced evaporation, cheaper power sources etc.

In many agricultural settings the fields are divided into blocks that each require different irrigation schedules and watering volumes. In the complex agricultural settings these schedules may be managed by different teams. Water supply to most irrigation systems is provided by pump(s) that provide pressurized water in the irrigation lines. Most larger farms have multiple pumps that either provide water to a specific section of the farm or provide water to a manifold that is on the outlet side of two or more pumps. Depending on the demand from the irrigation schedule, pump(s) are turned on and off and the speed that the pump runs at is also adjusted to provide the desired flow and pressure to all demand points. Manual operation of the pumps and communication of field information to the pump operators to actuate the pumps is expensive and lacks accountability.

Despite the recent global technological advances, the agricultural industry has not kept pace with modernization that other industries have enjoyed. There have been very few fundamental breakthroughs compared to the other industries and the agricultural industry has progressed organically by introduction of many "better and improved ways" that have been incomprehensive fixes to larger existing issues. There have been very few efforts to resolve the root cause. For decades field automations have been in the forefront of the agriculture industry innovations, but most of the systems have failed due to extensive use of wiring to power the irrigation valves and control devices. Additionally, all previous attempts have relied on the line power and control devices that have been adopted from other industrial applications, rendering these systems unreliable and hard to use in an agricultural setting. Experience has shown that wiring in the agricultural fields is prone to damage and hard to maintain. This is the reason behind the manual use of most of the automated valves in agricultural applications.

Thus, there have been devised automated agricultural valves that attempt to reduce such problems and lead to a more reliable watering operation. These automated valves for agricultural use are similar to the solenoid valves used for residential landscaping watering but are much larger in diameter. The actuation of these residential valves is by means of applying electric voltage to a solenoid coil that in turn moves a plunger to divert pressurized water between upper and lower chambers of the valve. Due to the high peak and consumption demand of the solenoids these valves are powered by (line voltage) electric power and the valves are hard wired to the control panel. Hard wiring is maintainable in smaller areas such as residential applications but in the farming applications they have proven to be unreliable and damage prone. Hence the electrical actuation is hardly ever used, and the valves are manually operated. This is obviously expensive and labor intensive considering the size of agricultural fields. Furthermore, there is a variation of the solenoids that latch in the on or off position with alternating electrical pulses. These are much lower in power consumption but still have usage peak upon actuation. The reason these valves are not favored in agriculture is the fact that they stay on or off without the user knowing what status they are which leads to a no feedback situation.

Furthermore, most agricultural solenoid valves are equipped with a flow regulator that restricts the valve diaphragm movement. This limits the volume of water that may pass through the valve. Turning this control knob allows the farmer/worker the ability to control the flow volume once the valve is turned on. The flow "control knob" on the agricultural valves that are equipped with this feature are placed on the top of the valve that is very obvious and easily accessible. The flow control feature is normally used once or twice in a growing season and is not intended for everyday use. With unrestricted access, these knobs may be turned and the flow adjusted by good-intentioned but curious individuals or even by unscrupulous people such as vandals or competitive businesses. The prominent position and ease of access to these valves invites tampering. As mentioned above, the current flow control knobs for agricultural valves have a large adjustment knob at the very top of the device. The adjustment knob is an attractive nuisance that may be adjusted by people who come across it not knowing the problems they are creating if they turn these knobs. Adjustments made by untrained, uneducated, or ill-intended actors may result in damage to the crops due to overwatering or underwatering.

Furthermore, rodents, livestock, farm machinery, and the like can negatively impact these automated valves. Rats and mice can chew through the water piping or the electronic wires used to control such automated valves. These conditions can cause havoc as such problems may go unnoticed for days or even weeks.

After learning of all the various ways automated waterflow control devices may be impaired, the inventor of the present invention has created a solution which reduces and/or eliminates such problems.

BRIEF DESCRIPTION OF THE DRAWINGS

The accompanying drawings illustrate the invention. In such drawings:

FIG. 25 is an isometric view of the turbine flow assembly of the water control device of FIG. 5;

FIG. 26 is another isometric view of the structure of FIG. 25;

FIG. 27 is an isometric view of the structure of FIG. 25 now with the turbine housing removed to show the magnets captured within the flow turbine;

FIG. 28 is a sectional view taken of the structure of FIG. 25 along lines 28-28;

DETAILED DESCRIPTION OF THE PREFERRED EMBODIMENTS

Figure 1:
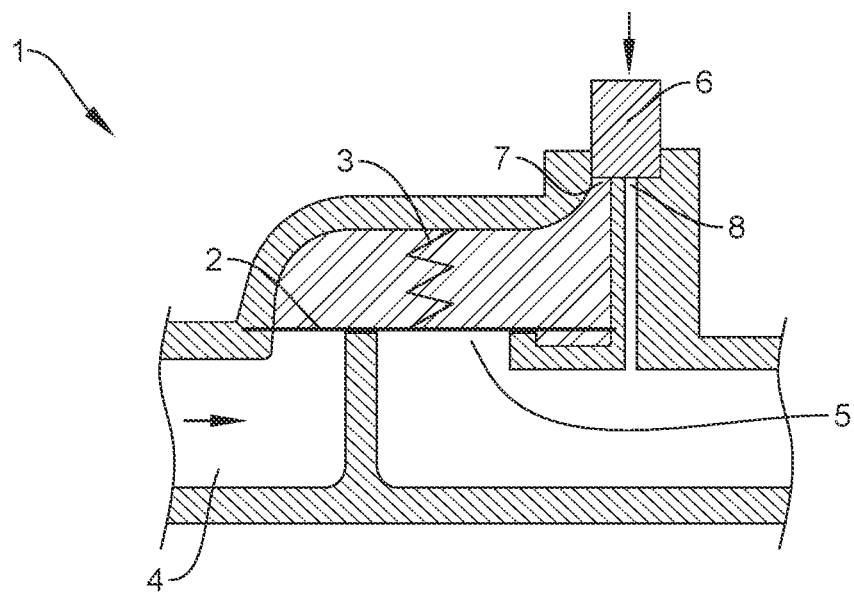
FIG. 1 is a simplified representation of a prior art diaphragm valve in a closed position.
Figure 2:
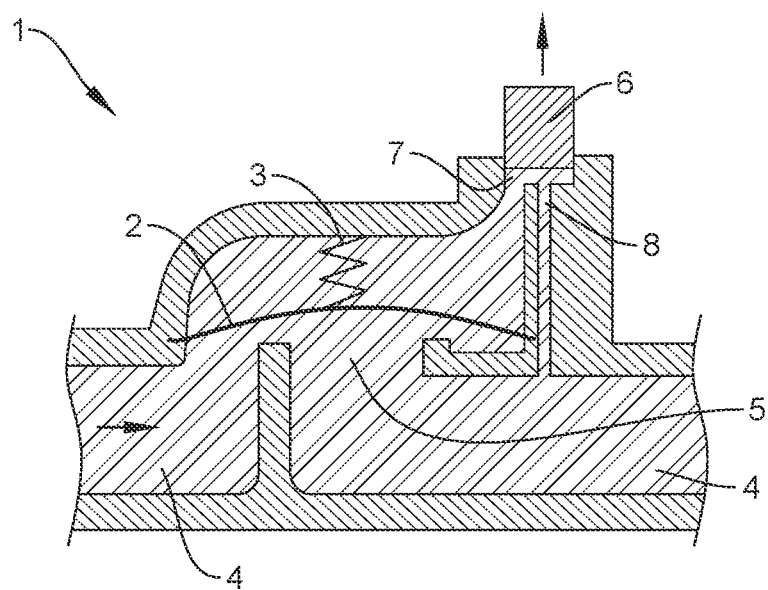
FIG. 2 is the same simplified representation of FIG. 1 now showing the diaphragm valve in an opened position.

FIGS. 1 and 2 illustrate a simplistic representation of a traditional diaphragm valve 1. FIG. 1 shows the valve in the closed position whereas FIG. 2 shows the valve in the open position. A flexible and resilient diaphragm 2 is preloaded with a compression spring 3. The fluid 4 creates pressure and forces the diaphragm to seal the opening 5 in FIG. 1. A solenoid 6 (i.e., plunger 6) is kept downward and seals a port 7. In FIG. 2 the solenoid is raised and fluid (e.g., water, oil and/or gas) is allowed to flow from port 7 to port 8 which then allows fluid to reach the opposite side of the diaphragm 2. The pressure of the fluid then forces the diaphragm upwards such that the fluid can flow directly through the opening 5.

The diaphragm valve of FIGS. 1 and 2 are described as being controlled by a Solenoid or Electromagnetic Actuation, which is the abbreviation SEA. These traditional electromagnetic actuators need to be hard wired because they consume electricity while activated and have a high peak consumption upon actuation. The latching electromagnetic actuators consume far less power, but they are not widely used because of lack of accountability. It is difficult to ascertain the valve's on/off status without information from a second source. Due to the problems discussed above, the present invention uses an Electric Motor Driven Mechanical Actuation, which has the abbreviation of EMDMA. The use of EMDMA necessitates changes in the traditional valve body, which is further discussed herein.

Figure 3:
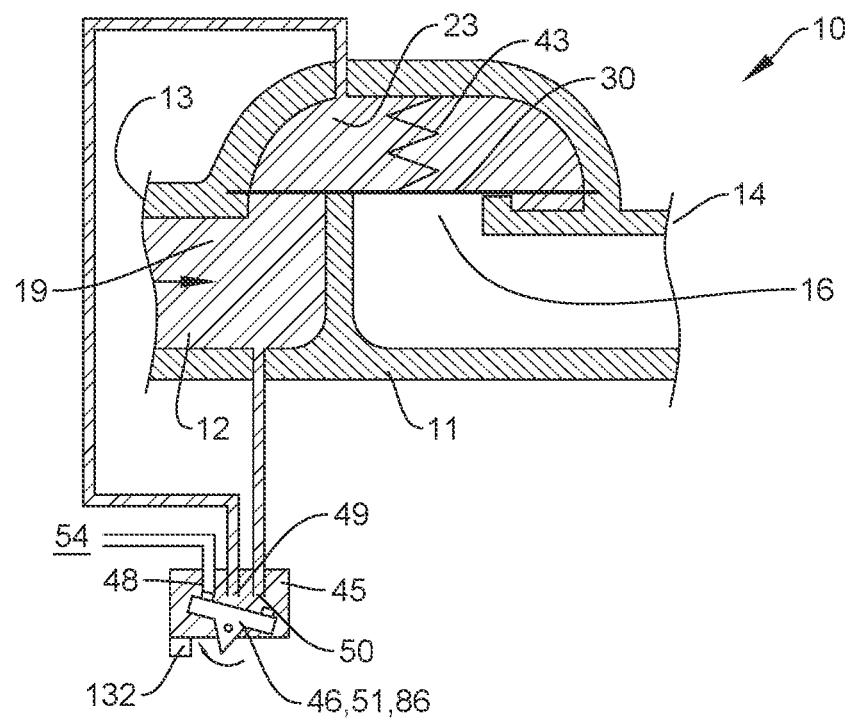
FIG. 3 is a simplified representation of a diaphragm valve of the present invention in the closed position.
Figure 4:
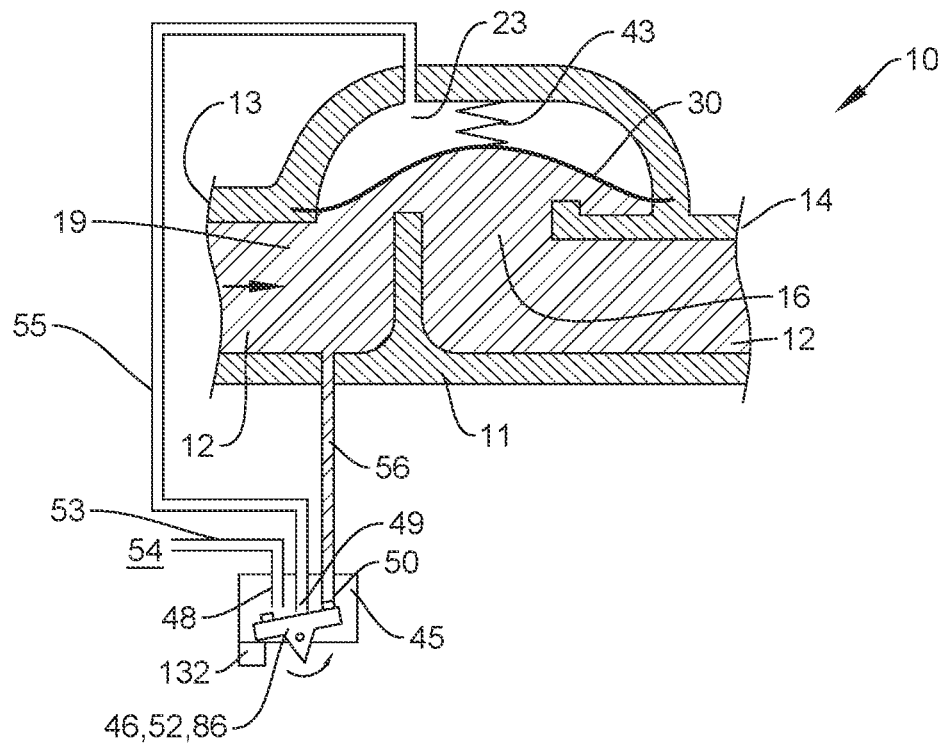
FIG. 4 is the same simplified representation of FIG. 3 now showing the diaphragm valve in the opened position.

FIGS. 3 and 4 illustrate a simplistic representation of a diaphragm valve 10 of the present invention. FIG. 3 shows the valve in the closed position whereas FIG. 4 shows the valve in the open position. A valve pipe section 11 is configured for the transportation of a fluid and/or a gas 12 and has a fluid inlet 13 opposite a fluid outlet 14. A diaphragm valve assembly 30 seals the fluid aperture 16 in FIG. 3 and is opened in FIG. 4 to let the fluid flow through the fluid aperture. A valve chamber 45 has three ports with a diverter valve 46 that is similar to toggle having a "seesaw" action. In FIG. 3, the diverter valve closes the first port 48. This means that fluid is able to flow between the second port 49 and the third port 50. This means that the pressure in the lower internal space 19 is the same as the pressure in the upper internal space 23, which in turn keeps the diaphragm valve assembly closed. In FIG. 4, the diverter valve opens the first port 48 to atmosphere 54 and closes the third port 50. Pressure inside the third port 49 is also then vented to atmosphere. This releases the pressure inside the upper internal space which in turn forces the diaphragm valve assembly to open and let the fluid and/or gas to flow through the fluid aperture. The toggling arm in FIG. 3 is in the position that connects the upper and pressurized chambers of the valve hence pushing the diaphragm down against the seal. FIG. 4 shows the valve in open position because the upper chamber of the valve is exposed to the atmosphere causing the inlet media pressure to push the diaphragm up sending the media from the inlet to the outlet side over the seal.

The valve of the present invention with EMDMA uses a small DC electric motor 47 to toggle the diverter valve 46. This in turn requires very short bursts of power to change the valve status. This consumes far less power to actuate the valve and allows a battery to supply power over a long period of time. Now, solar charging can also be used to maintain the batteries power level if desired. Now that a basic understanding the diaphragm valve of the present invention is understood, one skilled in the art is prepared to better understand the embodiment of the present invention shown and described in FIGS. 5-7.

Furthermore, the position of diverter valve 46 can be detected with a mechanical and/or optical sensor 132 as seen in FIGS. 3 and 4 that will affirm the position of the valve in case of interruption or to provide confirmations. In fact, one sensor may be sufficient because movement of 46 is binary, as it is in either one of just two positions.

Figure 5:
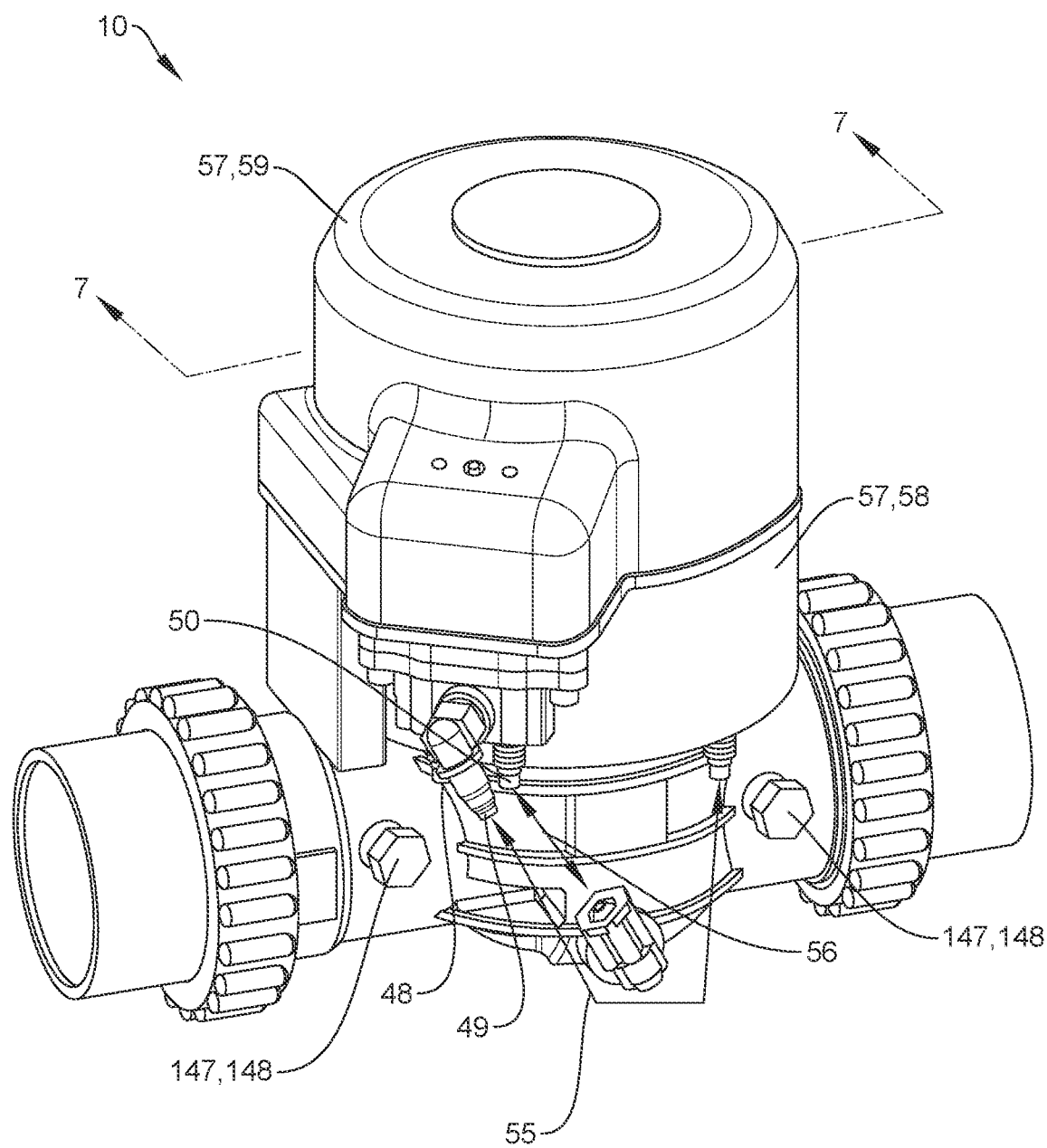
FIG. 5 is an isometric view of an embodiment of the present invention being a water control device having a diaphragm valve.
Figure 6:
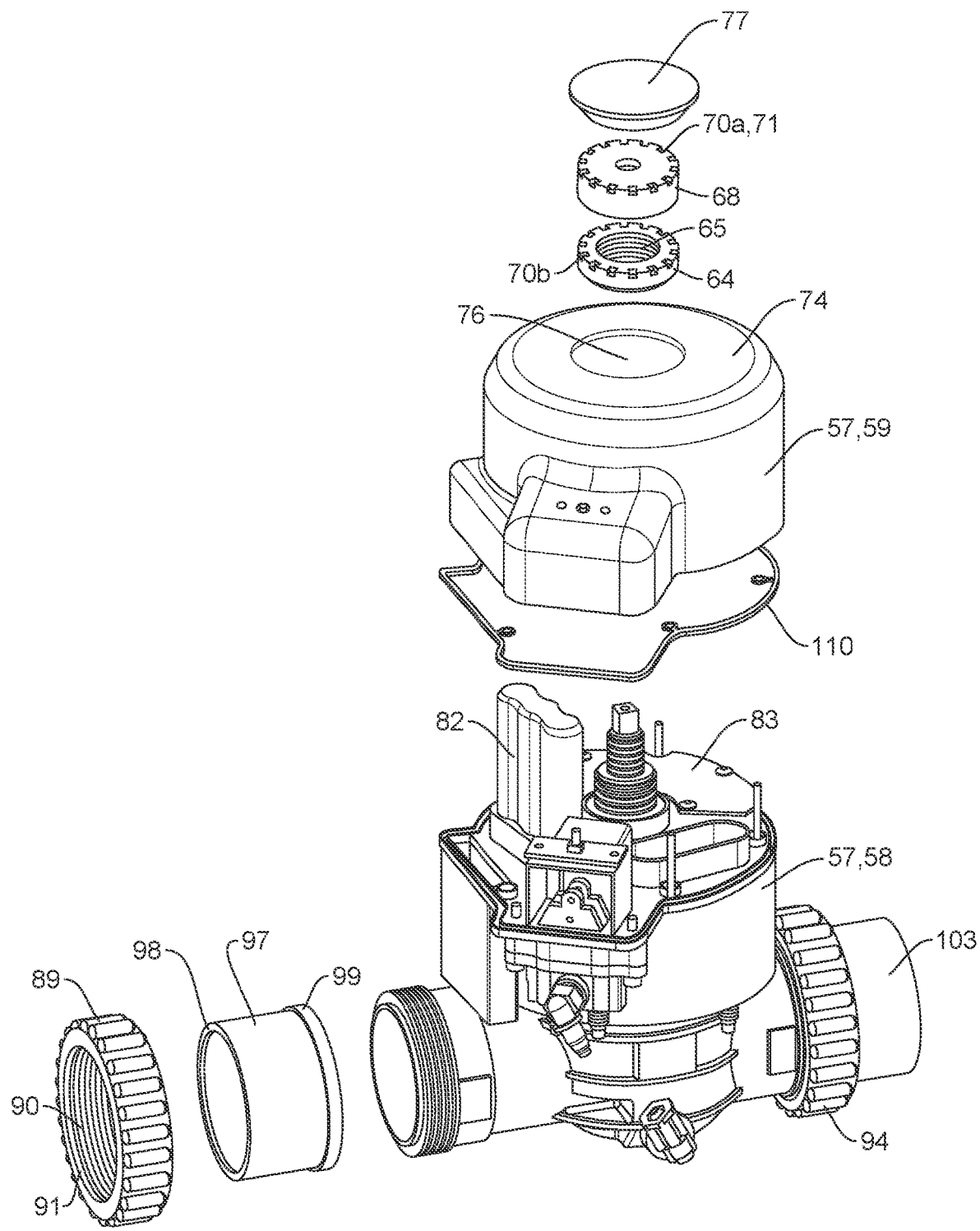
FIG. 6 is a partially exploded view of the structure of FIG. 5.
Figure 7:
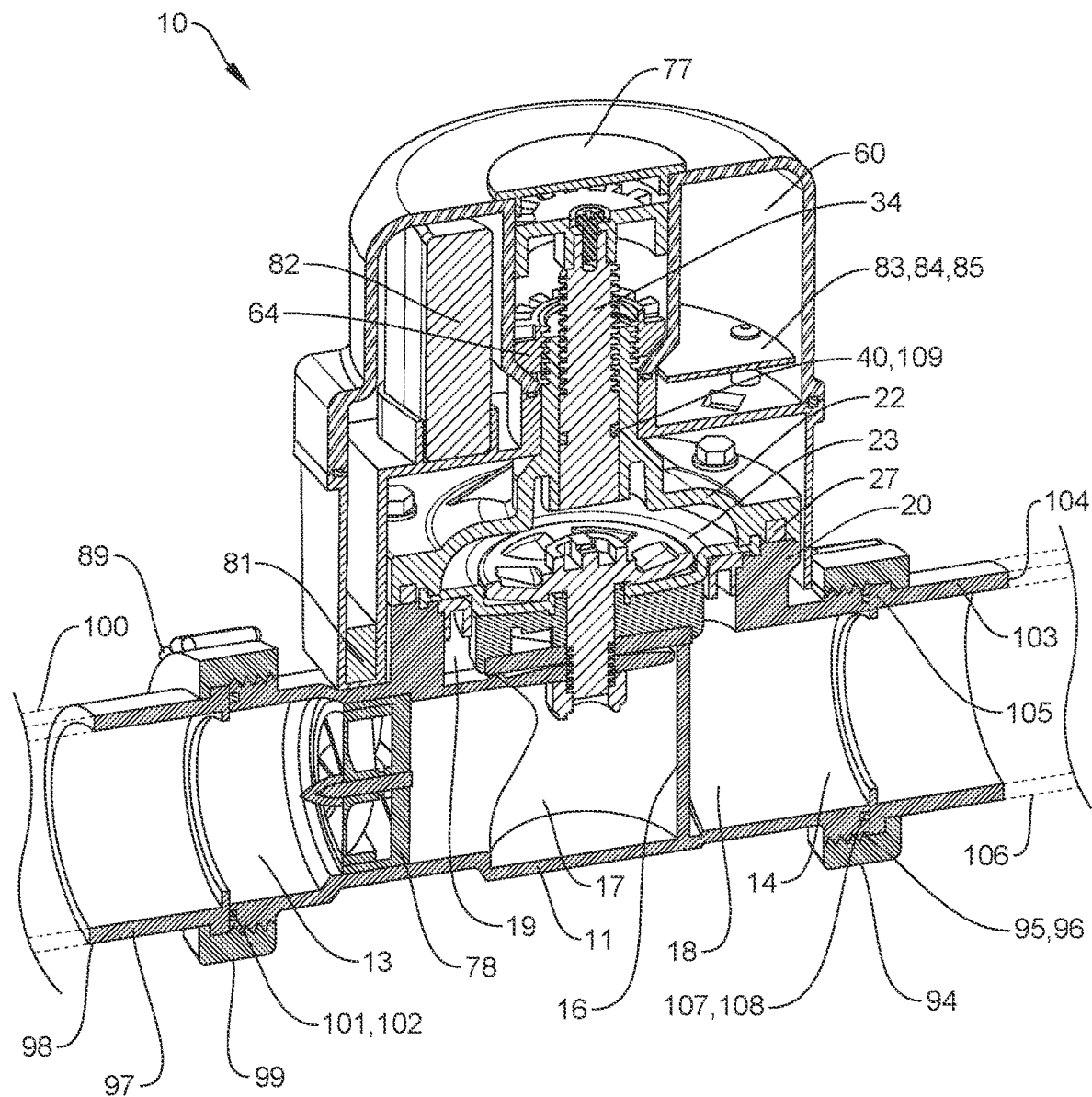
FIG. 7 is a sectional view of the structure of FIG. 5 taken along lines 7-7 from FIG. 5.

FIG. 5 is an isometric view of one embodiment of the present invention being a water control device 10 configured for agricultural irrigation. FIG. 6 is a partially exploded view of the structure of FIG. 5. FIG. 7 is a sectional view of the structure of FIG. 5 taken along lines 7-7 from FIG. 5.

Figure 9:
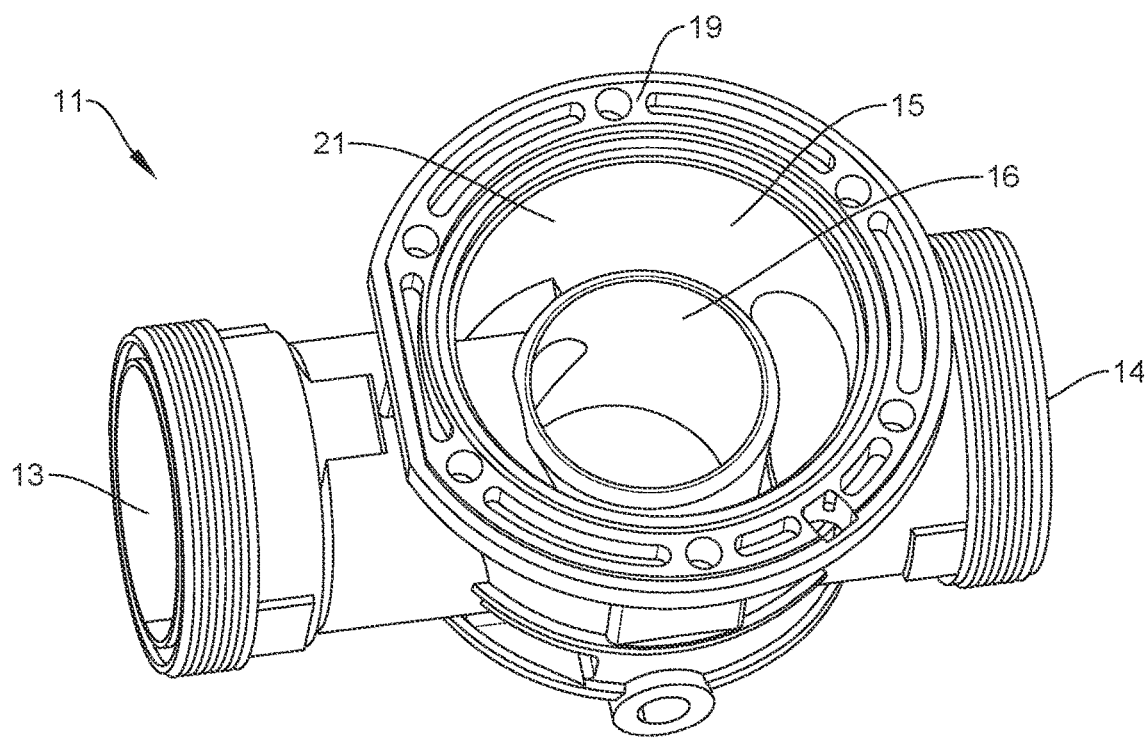
FIG. 9 is an isometric view of only the valve pipe section of the water control device of FIG. 5.
Figure 10:
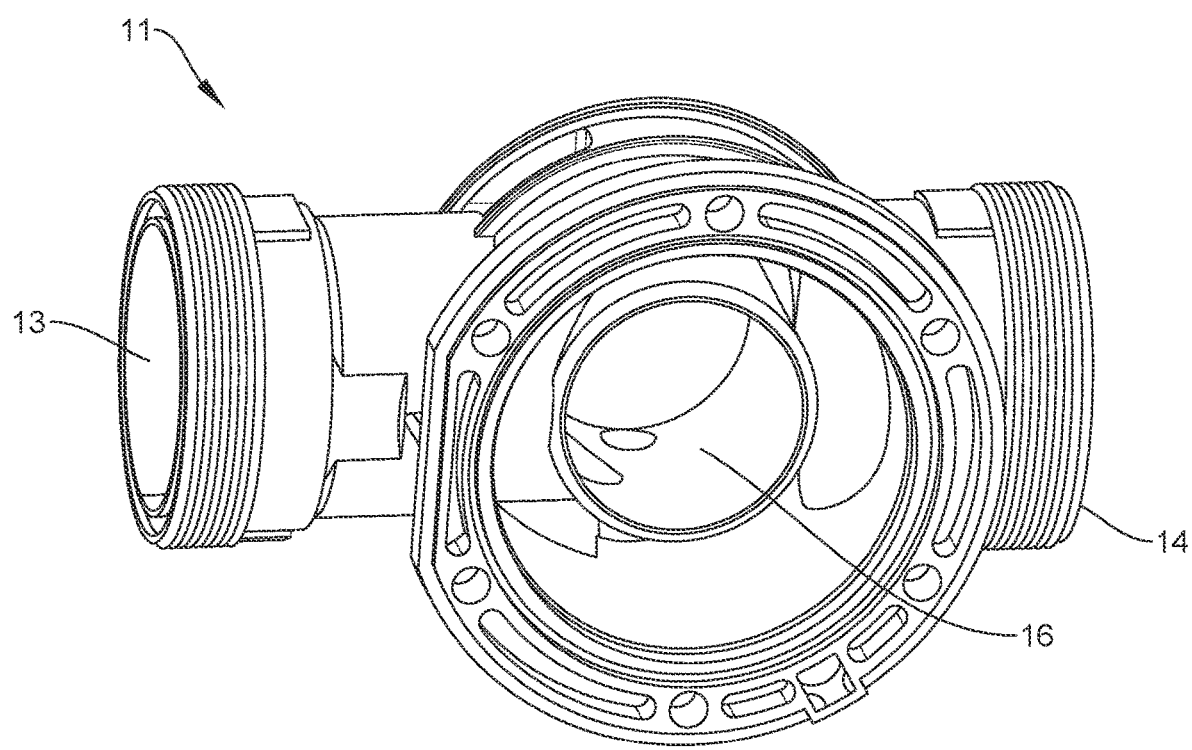
FIG. 10 is another isometric view of the structure of FIG. 9.

The valve pipe section 11 is configured for the transportation of a fluid and/or a gas 12. The valve pipe section is best seen in FIGS. 9-10. The valve pipe section comprises a fluid inlet 13 opposite a fluid outlet 14. The valve pipe section comprises a lower diaphragm valve housing 15 disposed between the fluid inlet and the fluid outlet. The valve pipe section comprises an internally disposed fluid aperture 16. The fluid inlet and fluid outlet are in fluidic communication when the fluid aperture is not blocked. Correspondingly, the fluid inlet and fluid outlet are not in fluidic communication when the fluid aperture is blocked. The fluid aperture separates an inlet portion 17 associated with the fluid inlet from an outlet portion 18 associated with the fluid outlet. The lower diaphragm valve housing comprises a lower internal space 19 with a lower flange 20 delimiting a diaphragm opening 21. It is noted that the lower internal space is disposed in the outlet portion as it is on the outlet side of the fluid aperture 16. As best seen in FIGS. 9-10, the fluid inlet, the fluid outlet, the lower diaphragm valve housing, the fluid aperture and the lower flange of the valve pipe section are integrally (monolithically) formed as a single part from either a plastic injection molding process or a metal casting process.

Figure 11:
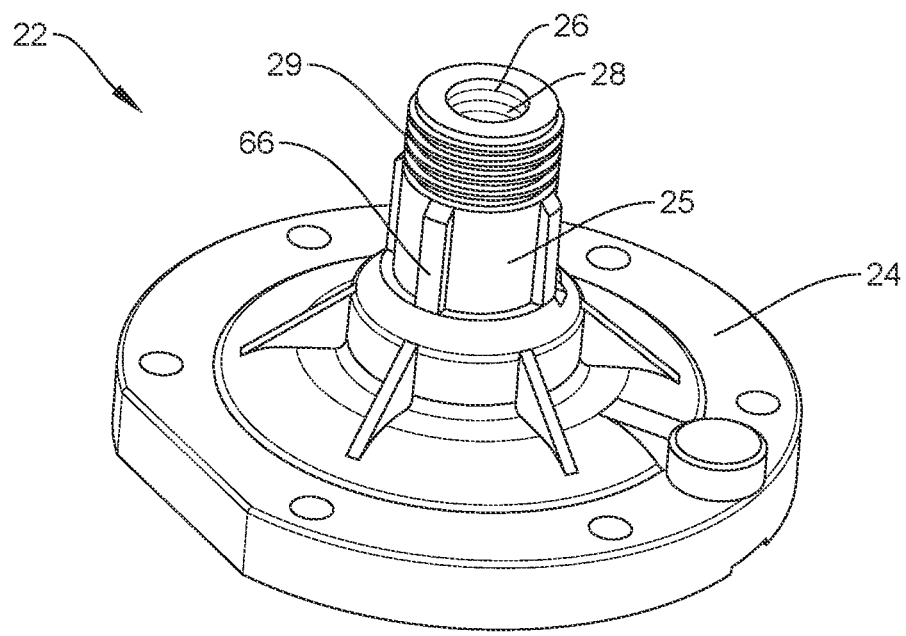
FIG. 11 is an isometric view of only the upper diaphragm valve housing of the water control device of FIG. 5.
Figure 12:
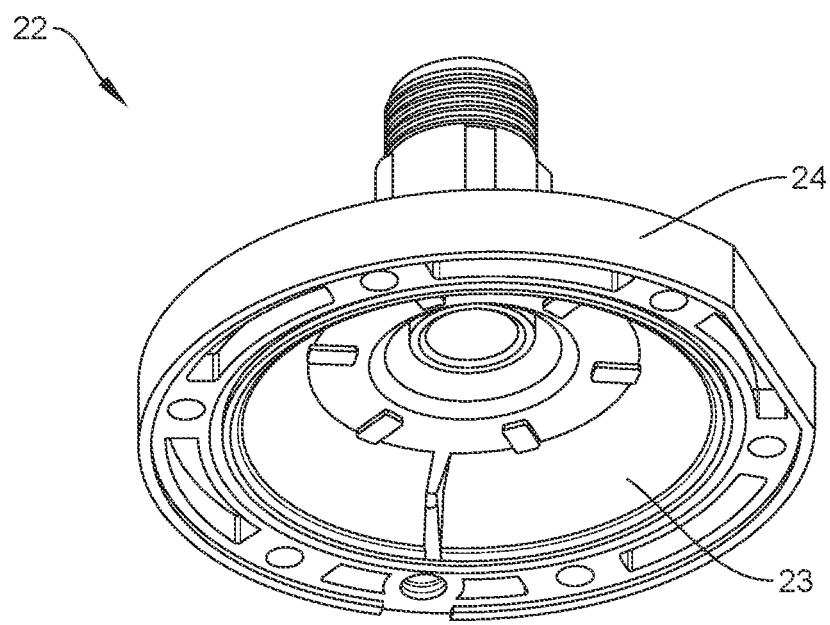
FIG. 12 is another isometric view of the structure of FIG. 11.

As best seen in FIGS. 11-12, and also seen in FIG. 7, an upper diaphragm valve housing 22 defines an upper internal space 23. The upper internal space is disposed between an upper flange 24 opposite an extension 25. The extension has an adjustment screw opening 26. The upper flange and lower flange are configured to be attached to one another and fluidically seal to one another through the use of a flange seal 27. At least a portion of the extension has an internally disposed screw thread 28. At least a portion of the extension has an externally disposed screw thread 29.

Figure 23:
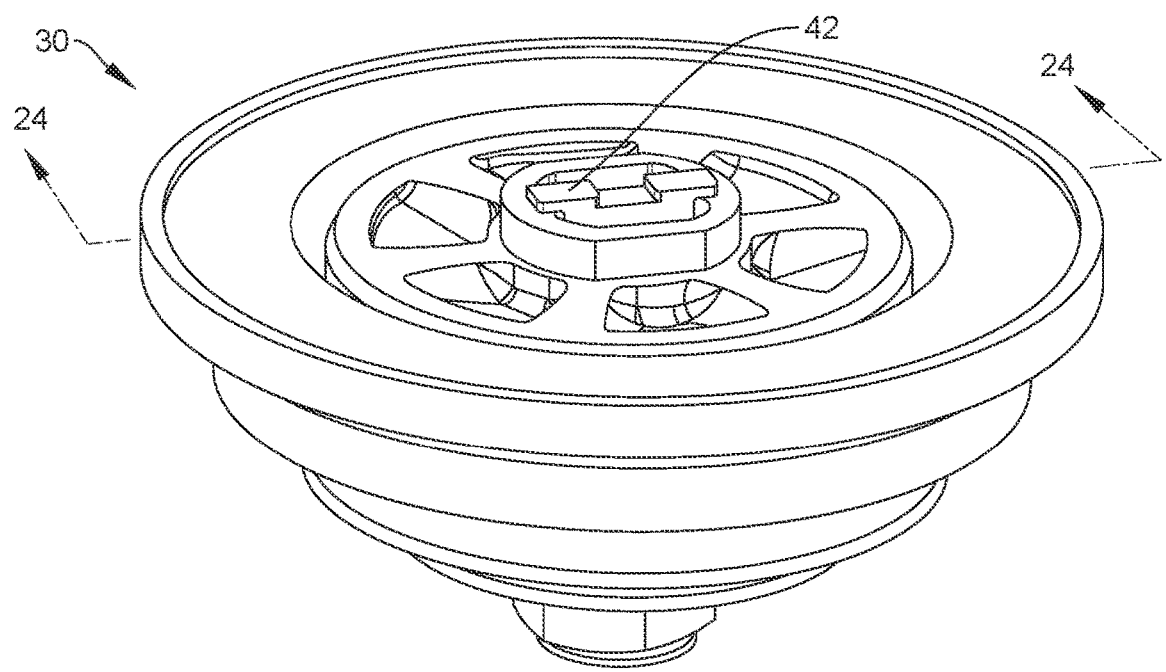
FIG. 23 is an isometric view of the diaphragm assembly of the water control device of FIG. 5.
Figure 24:
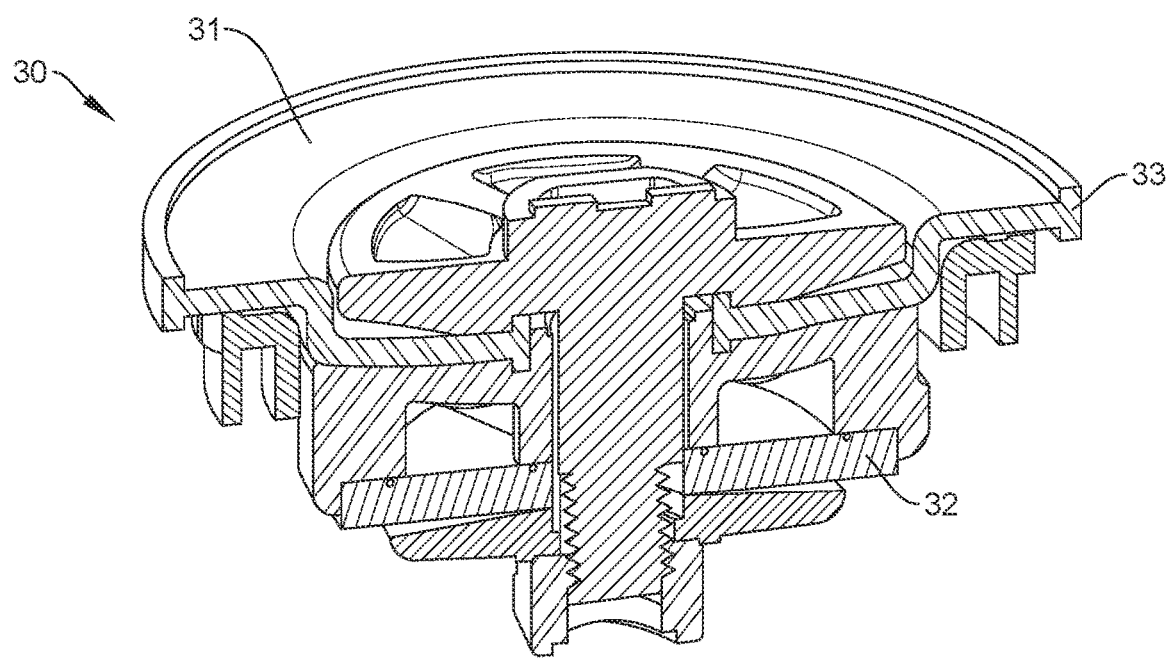
FIG. 24 is a sectional view of the structure of FIG. 23 taken along lines 24-24.

A diaphragm valve assembly 30 is best seen in FIGS. 23-24 and also FIG. 7. The diaphragm valve assembly is disposed at least partially in the lower internal space and/or the upper internal space. The diaphragm valve assembly comprises a flexibly resilient diaphragm 31 connected to a fluid aperture seal 32. The flexibly resilient diaphragm is captured at a periphery 33 between the lower flange and the upper flange. The fluid aperture seal is configured to seal and unseal the fluid aperture dependent upon position of the fluid aperture seal. When the diaphragm valve assembly is installed between the lower flange and the upper flange it fluidically seals and separates the upper internal space from the lower internal space.

Figures 17, 18:
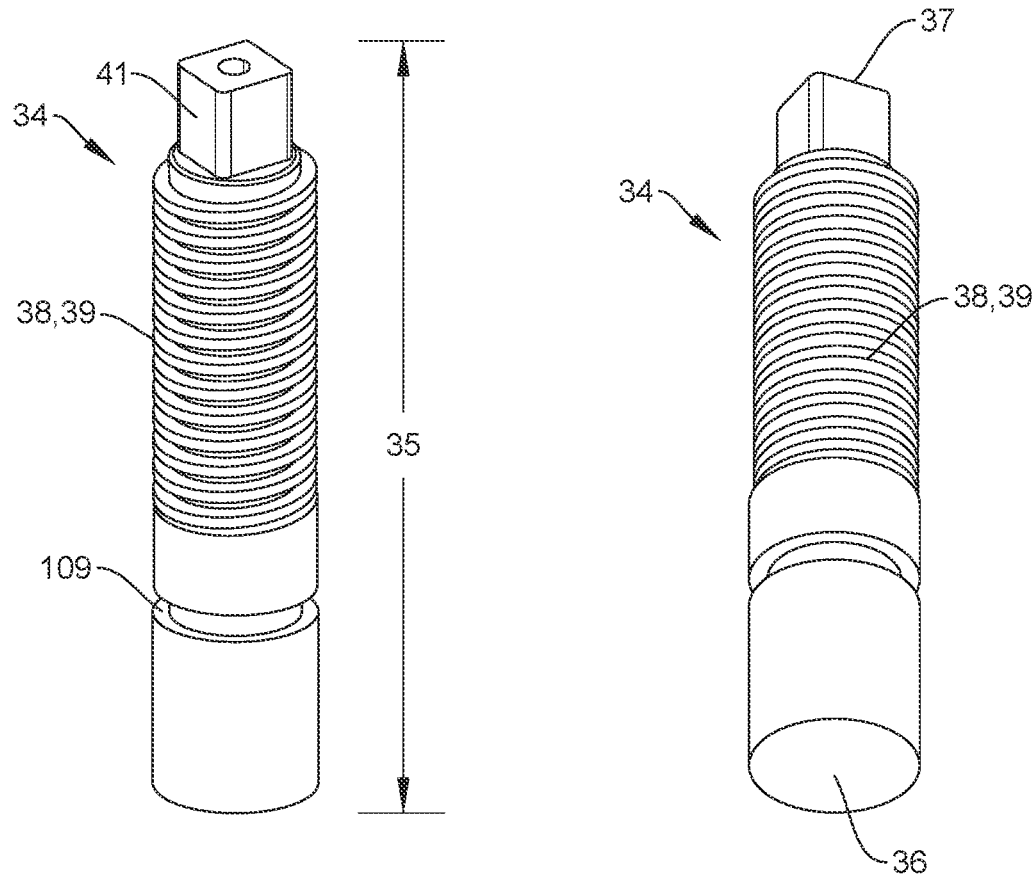
FIG. 17 is an isometric view of only the flow adjustment screw of the water control device of FIG. 5.
FIG. 18 is another isometric view of the structure of FIG. 17.

A flow adjustment screw 34 is best seen in FIGS. 17-18 and also in FIG. 7. The flow adjustment screw extends longitudinally along a length 35 from a distal end 36 to a proximal end 37. At least a portion of an outside surface 38 of the flow adjustment screw has an externally disposed screw thread 39. The externally disposed screw thread of the flow adjustment screw is configured to threadably engage with the internally disposed screw thread of the flow adjustment screw opening of the upper diaphragm valve housing. A flow adjustment screw seal 40 is disposed between the flow adjustment screw and the extension of the upper diaphragm valve housing. In this embodiment, the seal 40 is captured in an annular channel 109. The proximal end of the flow adjustment screw comprises a non-circular end 41 configured to be non-rotatably engaged. The distal end of the flow adjustment screw is configured to abut at least a portion 42 of the diaphragm valve assembly when the diaphragm assembly is opened to allow the gas and/or fluid to flow past the fluid aperture. This means that rotation of the flow adjustment screw moves its distal end closer to or father away from the diaphragm valve assembly when opened allowing control over a flow rate of the water control device.

The embodiment shown in FIG. 7 does not show the compression spring 43 for simplicity. The compression spring 43 is the same as compression spring 43 taught in FIGS. 3-4. The compression spring is biased and disposed between the diaphragm valve assembly and the upper diaphragm valve housing.

An electric motor driven mechanical actuation fluid pressure diverter assembly 44 is best seen in FIGS. 3-4, 8 and 20-22. The assembly 44 comprises a valve chamber 45 and a diverter valve 46 mechanically driven by an electric motor 47. The valve chamber comprises a first port 48, a second port 49 and a third port 50. The diverter valve is configured to move between a first position 51 and a second position 52 by the electric motor as best seen in FIGS. 3 and 4. The diverter valve in the first position fluidically seals the first port and allows fluidic communication through the valve chamber between the second port and the third port. The diverter valve in the second position fluidically seals the third port and allows fluidic communication through the valve chamber between the second port and the first port. A first fluidic connection 53 is between the first port of the valve chamber and an external atmosphere 54. A second fluidic connection 55 is between the second port of the valve chamber and the upper internal space of the upper diaphragm valve housing. A third fluidic connection 56 is between the valve chamber and the inlet portion of the valve pipe section. In FIG. 5, the second fluidic connection 55 is not shown but represented by the arrows 55. Likewise, in FIG. 5, the third fluidic connection 56 is not shown but represented by the arrows 56.

Figure 13:
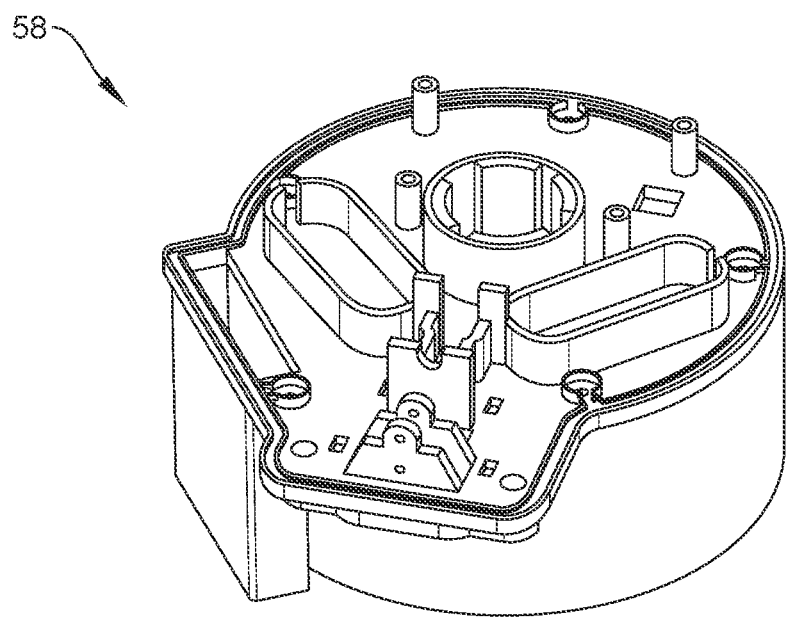
FIG. 13 is an isometric view of only the base structure of the water control device of FIG. 5.
Figure 14:
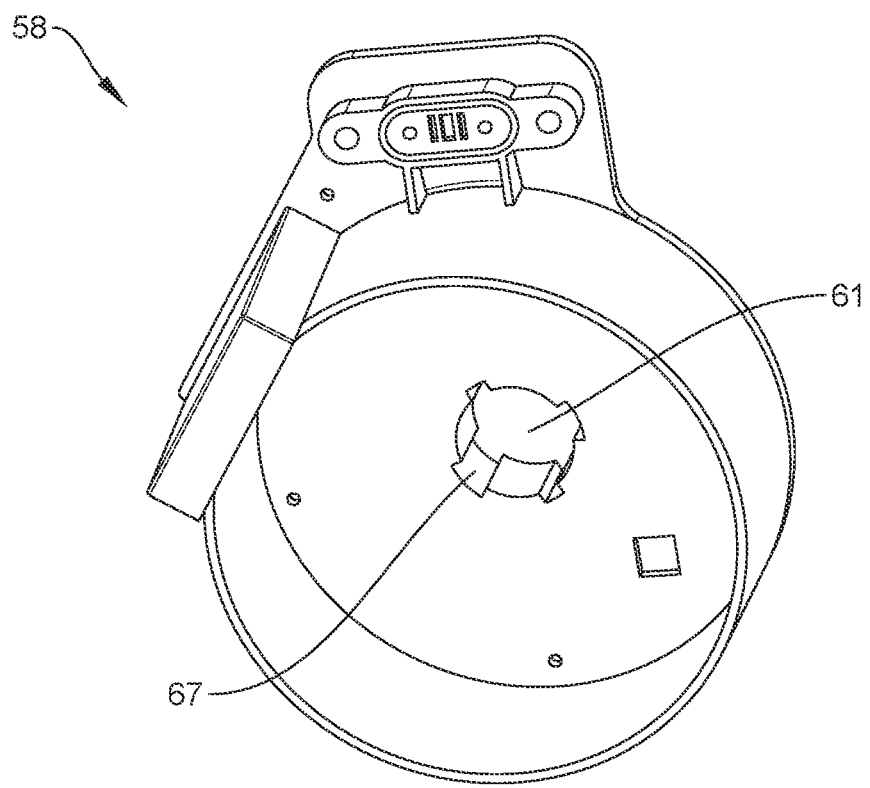
FIG. 14 is another isometric view of the structure of FIG. 13.
Figure 15:
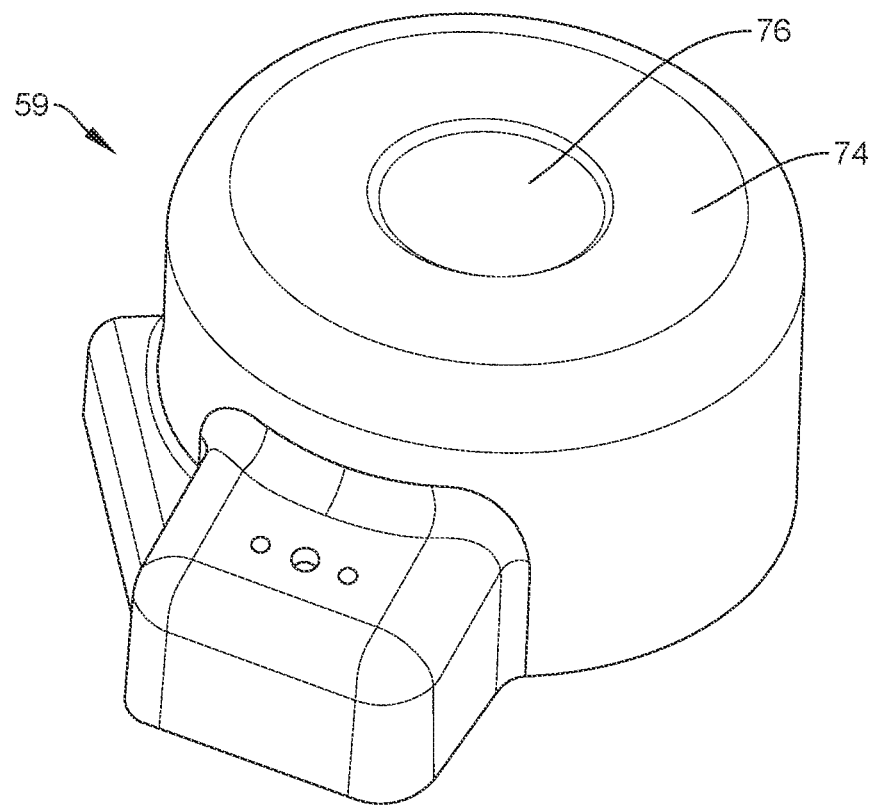
FIG. 15 is an isometric view of only the cover of the water control device of FIG. 5.
Figure 16:
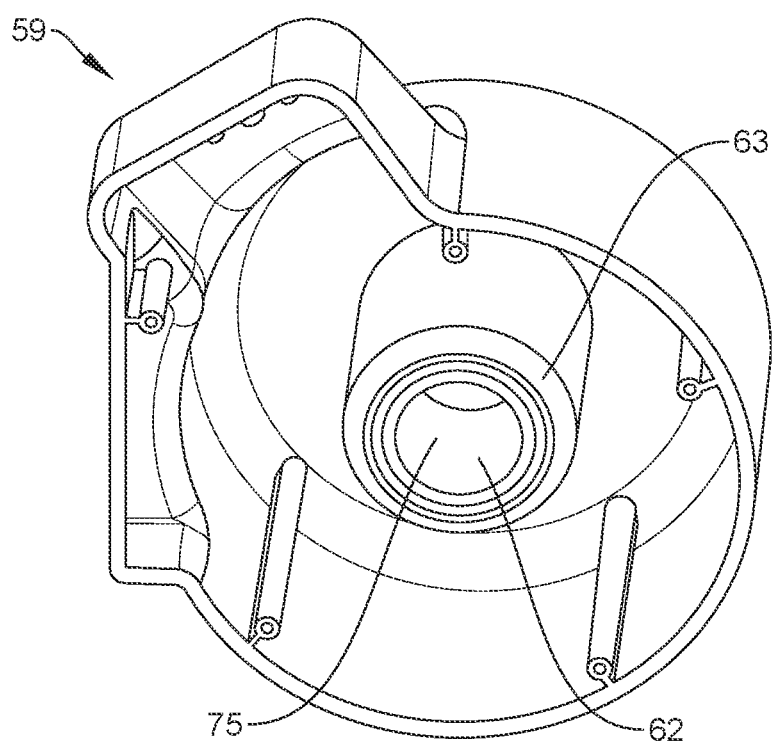
FIG. 16 is another isometric view of the structure of FIG. 15.

A control assembly 57 is configured to be removably mounted to the upper diaphragm valve housing. The control assembly comprises a base structure 58 and a cover 59, wherein the cover is configured to be disposed on top of the base structure forming an interior space 60 therebetween. A seal 110 can reside between the base structure and cover. The base structure is best seen in FIGS. 13-14. The cover is best seen in FIGS. 15-16.

Figure 8:
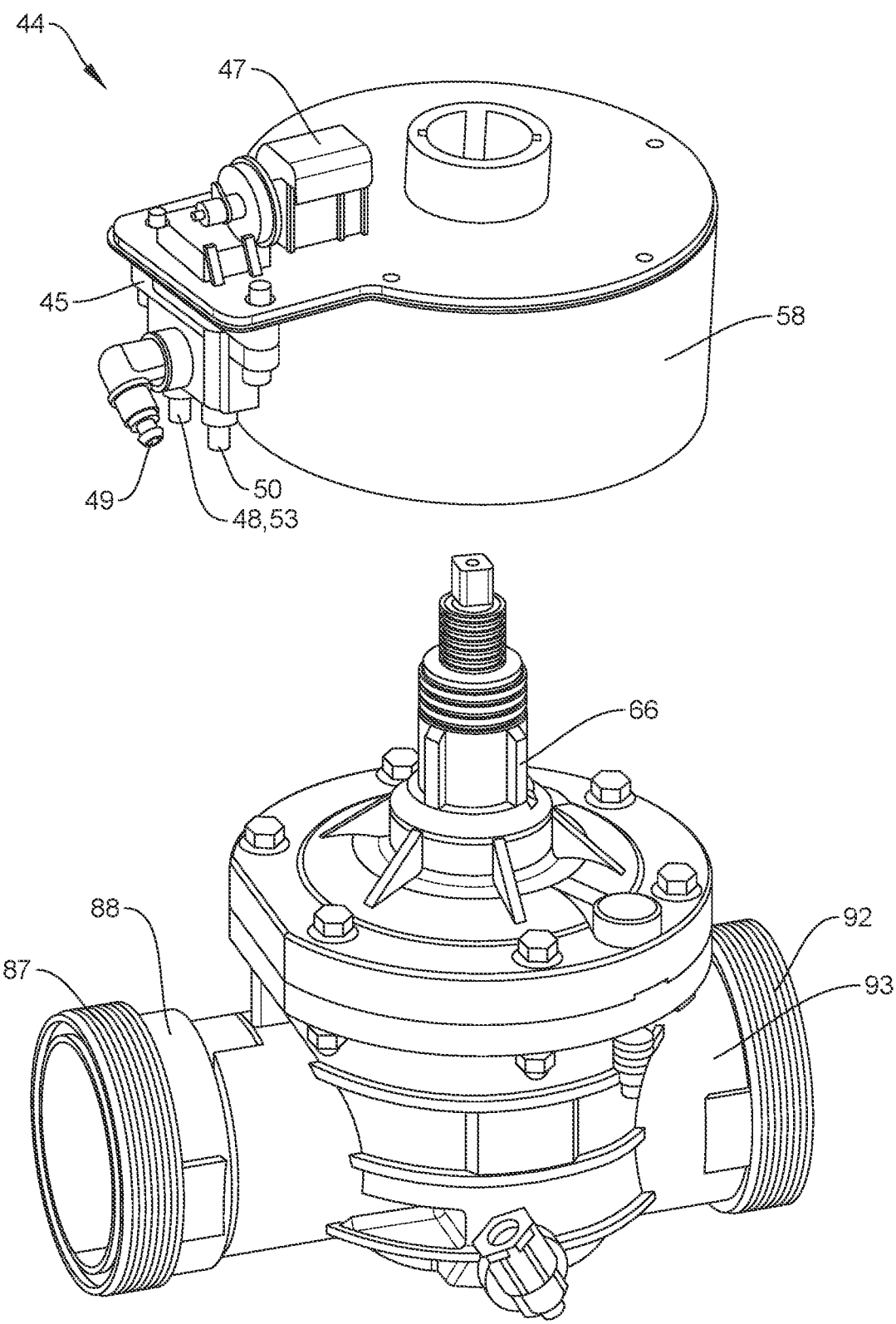
FIG. 8 is a partially exploded view of the structure of FIG. 5 with the cover removed illustrating the base structure is removable from the diaphragm valve assembly.

As best seen in FIG. 8, the electric motor driven mechanical actuation fluid pressure diverter assembly is mounted to or formed as part of the base structure.

The base structure has a base hole 61 and the cover has a cover hole 62. When the control assembly is mounted to the upper diaphragm valve housing at least a part of the extension of the upper diaphragm valve housing extends through the base hole and the cover hole where the externally disposed screw thread of the extension at least partially extends past the cover hole. The cover hole is delimited by a cover hole flange 63.

As best seen in FIG. 6, a cover nut 64 has an internally disposed screw thread 65 configured to threadably engage with the externally disposed screw thread of the extension. The cover nut is configured to abut the cover hole flange and threadably engaged with the extension securing the cover to the base structure and in turn securing the base structure to the upper diaphragm valve housing.

The base hole of the base structure is configured to engage the extension non-rotatably. The extension comprises at least one protrusion 66 that non-rotatably engages with at least one recess 67 formed in the base hole.

Figure 33:
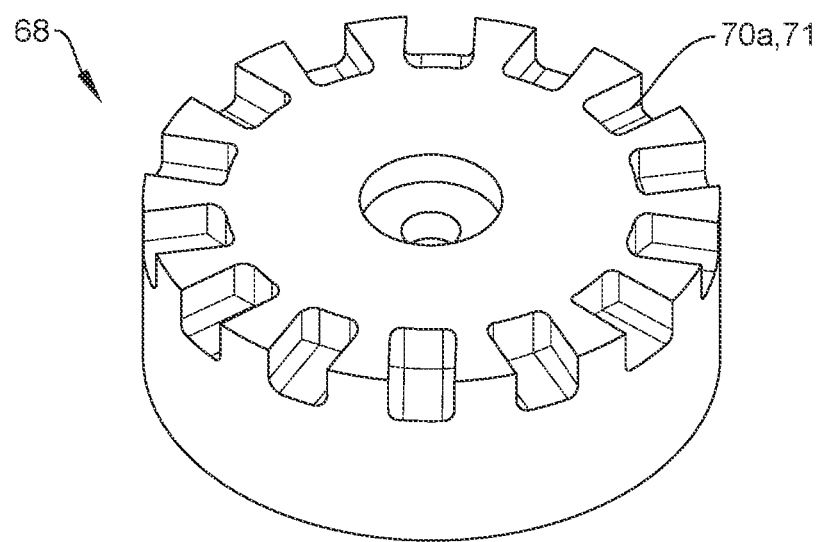
FIG. 33 is an isometric view of only the flow regulation knob of the water control device of FIG. 5.
Figure 34:
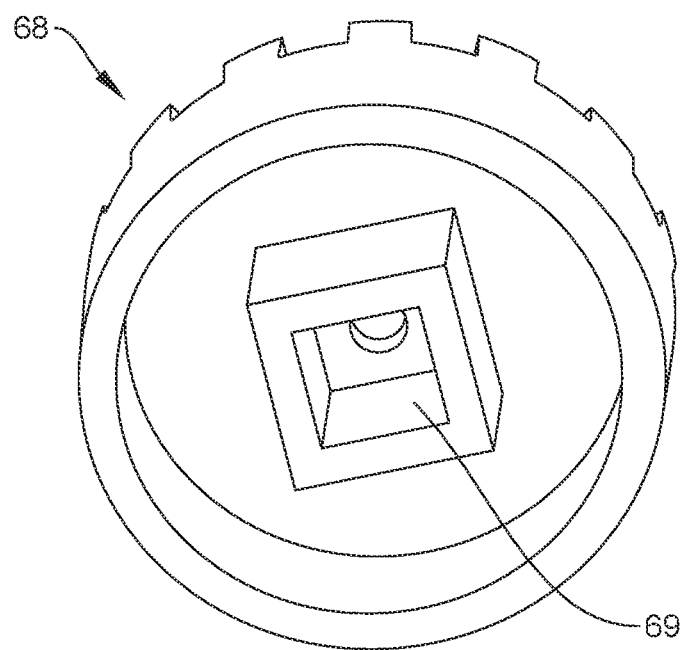
FIG. 34 is another isometric view of the structure of FIG. 33.

As seen in FIG. 6 and best in FIGS. 33-34, a flow regulation knob 68 has a non-circular recess 69 configured to non-rotatably engage with the non-circular end of the flow adjustment screw. The non-circular end and non-circular recess are rectangular shaped, square shaped or triangular shaped. The flow regulation knob comprises a tamper proof surface 70a comprising a first plurality of protrusions and/or recesses 71 which are configured to be non-rotatably engaged by a separately disposed flow adjustment tool 72 comprising a second plurality of recesses and/or protrusions 73.

Figure 29:
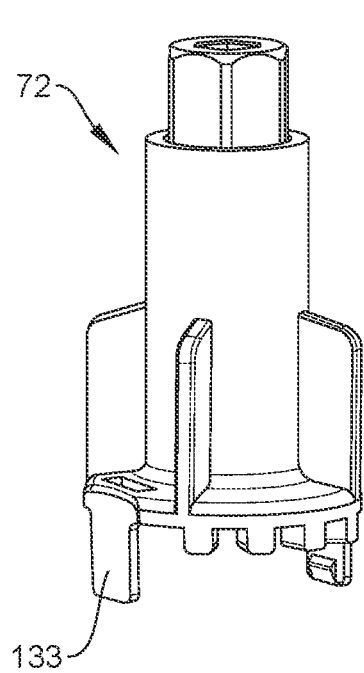
FIG. 29 is an isometric view of only the flow adjustment tool used to adjust the water control device of FIG. 5.
Figure 30:
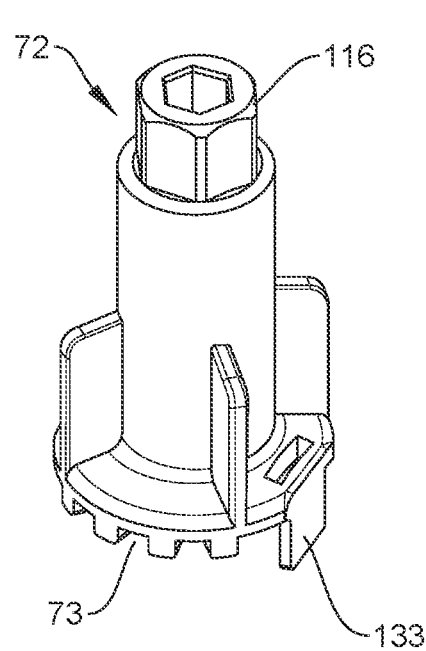
FIG. 30 is another isometric view of the structure of FIG. 29.
Figure 31:
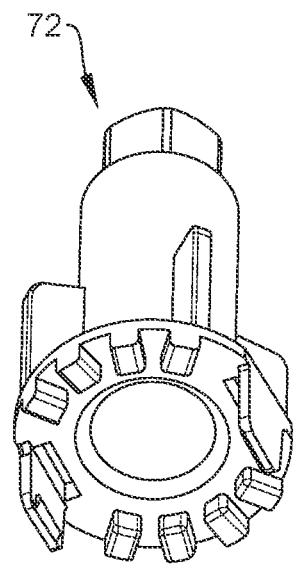
FIG. 31 is another isometric view of the structure of FIG. 29.
Figure 32:
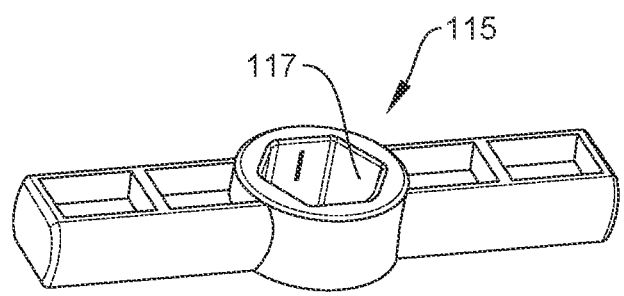
FIG. 32 is an isometric view of handle configured for use with the flow adjustment tool of FIGS. 29-31.

The flow adjustment tool 72 is best seen in FIGS. 29-31. A separately manufactured handle 115 has a non-circular recess 117 that is configured to non-rotatably receive the non-circular proximal end 116 of the flow adjustment tool. It is understood that the flow adjustment tool and the handle could be manufactured as a single part or fastened together to create a single part. In this embodiment, there are two tabs 133 that stick downward, as these tabs are used to hold the cover nut 64 or flow regulation nut 68 during insertion or removal.

The cover nut also comprises a second tamper proof surface 70b similar in shape to the tamper proof surface of the flow regulation knob.

The cover hole flange is disposed recessed from a top 74 of the cover forming a cover recess 75 having a top cover aperture 76 located the top of the cover. A cover cap 77 is configured to attach and close the top cover aperture. As seen in FIG. 7, the flow regulation knob and the cover nut are configured to be disposed within the cover recess and located between the cover hole flange and the top of the cover.

As best seen in FIGS. 25-28, a flow turbine assembly 78 is removably disposed within the inlet portion as seen in FIG. 7. The flow turbine 111 is configured to rotate about a shaft 79 with the optional use of a bearing 113 when the fluid and/or the gas flows through the valve pipe section. The flow turbine has at least one magnet 80. The shaft 79 is connected to a turbine housing 112. The turbine housing is configured to easily be placed and/or removed from the inlet portion of the valve pipe section. A turbine cone 114 helps the flow through the turbine 111. Referring to FIG. 7, a Hall Effect sensor 81 is disposed in close proximity to the at least one magnet, wherein the Hall Effect sensor is located within the control assembly.

A Hall Effect sensor 81 and a flow sensor PCB (i.e., printed circuit board 83) are utilized to sense the rotation of the flow turbine wheel 111 due to the magnets 80. A Hall Effect sensor is a transducer that varies its output voltage in response to a magnetic field. Hall Effect sensors are commonly used to time the speed of wheels and shafts, such as for internal combustion engine ignition timing, tachometers and anti-lock braking systems. Herein, they are used to detect the position of the permanent magnet. It is understood by one skilled in the art that other sensors could be utilized to determine the flow rate of the fluid. Other sensors include a thermal mass flow sensors, an ultrasonic flow sensors and a piston sensor. Furthermore, in place of the Hall Effect sensor a reed switch can also be used.

The control assembly includes a battery 82 powering an electronic circuit board 83. The electronic circuit board is configured to control the electric motor. The electronic circuit board includes a wireless connection utilizing a transmitter 84 and a receiver 85 configured to send and receive over Wi-Fi, Bluetooth, Satellite, or Cellular communications. It is also possible to hardwire electrical power to the water control device of the present invention.

It is worth noting that the water control device and the electric motor driven mechanical actuation fluid pressure diverter assembly does not comprise a solenoid and does not comprise an electromagnetic actuation.

The diverter valve comprises a toggle arm 86 configured to pivot between the first position and the second position.

The fluid inlet of the valve pipe section comprises an external (i.e., male) screw thread 87 formed on an outside circumferential surface 88.

Referring to FIGS. 6-8, an inlet-side nut 89 comprises an internal (female) screw thread 90 formed on an inside circumferential surface 91 of the inlet-side nut. The fluid outlet of the valve pipe section comprises an external (male) screw thread 92 formed on an outside circumferential surface 93. An outlet-side nut 94 comprising an internal (female) screw thread 95 formed on an inside circumferential surface 96 of the outlet-side nut.

A first pipe stub 97 is configured for the transportation of the fluid and/or the gas defining a first end 98 opposite a flanged end 99. The inlet-side nut is configured to be disposed around the first pipe stub, wherein the first end of the first pipe stud is configured to be permanently attached to a first pipe section 100. The flanged end is configured to attach to the fluid inlet of the valve pipe section by the inlet-side nut abutting the flanged end of the first pipe stub when the internal screw threads of the inlet-side nut threadably engages with the external screw threads of fluid inlet of the valve pipe section.

The first pipe stub is fluidically sealed to the fluid inlet of the valve pipe section by an inlet-side O-ring and/or annular seal 101 disposed therebetween. The inlet-side seal is at least partially disposed within a first annular cavity 102 formed in the fluid inlet of the valve pipe section. In this embodiment, the seal 101 has a square or rectangular section as opposed to a circular section. O-rings with circular sections often get displaced or fall off during the installation. Thus, in this embodiment, there is a slightly tapered channel that is formed as the first annular cavity 102. Thus, the seal is generally rectangular or square in a sectional view such that it is partially captured within the first annular cavity 102 when it is placed within during installation. Furthermore, the rectangular or square section creates more contact area in comparison to a circular section and therefore creates a better seal.

A second pipe stub 103 is configured for the transportation of the fluid and/or the gas defining a first end 104 opposite a flanged end 105. The outlet-side nut is configured to be disposed around the second pipe stub, wherein the first end of the second pipe stud is configured to be permanently attached to a second pipe section 106. The flanged end is configured to attach to the fluid outlet of the valve pipe section by the outlet-side nut abutting the flanged end of the second pipe stub when the internal screw threads of the outlet-side nut threadably engages with the external screw threads of fluid outlet of the valve pipe section. The second pipe stub is fluidically sealed to the fluid outlet of the valve pipe section by an outlet-side O-ring or annular seal 107 disposed therebetween. The outlet-side seal is at least partially disposed within a second annular cavity 108 formed in the fluid outlet of the valve pipe section. The second annular cavity 108 and seal 107 can be formed similarly as to the previous teaching of the first seal 101 and cavity 102.

The embodiment taught herein using the valve of the present invention is more flexible because the connections to the upper and lower chambers of the valve can be independent as opposed to the SEA type that should be stacked. This allows a lot more flexibility of design because the hoses running from the chambers to the divertor that is attached to the actuator, can be configured according to the design needs.

The detachable control assembly 57 (i.e., base structure 58 and cover 59) described herein acts as a control box. This contains the following: EMDMA actuation mechanism, batteries, and the circuit board. The circuit board, in addition to a host of other circuits, contains the following: microcontroller/microprocessor; data storage/memory; solar battery charging circuit; multi-format auxiliary circuits; Hall Effect signal processor circuit for the device flow sensor; mesh network communication circuit; low battery power notification circuit; tamper proof ON/OFF switch that is concealed and cannot be activated with removing the housing/control box; and external connection for solar panel, antenna, and pressure sensor.

In this embodiment, there are at least two software configurable auxiliary connections that in addition to DC voltage outputs, can act as an input channel for a third-party analog and/or binary signals in addition to a two-way digital communication, digital and audiovisual communication capability with other smart devices. It is noted that an analog signal can be 0-5 VDC or 4-20 mA such as pressure sensors, digital signals with another microprocessor/controller, a weather station or a video camera. Data from the auxiliary ports can be imputed to the processor algorithms to optimize irrigation parameters.

Figure 20:
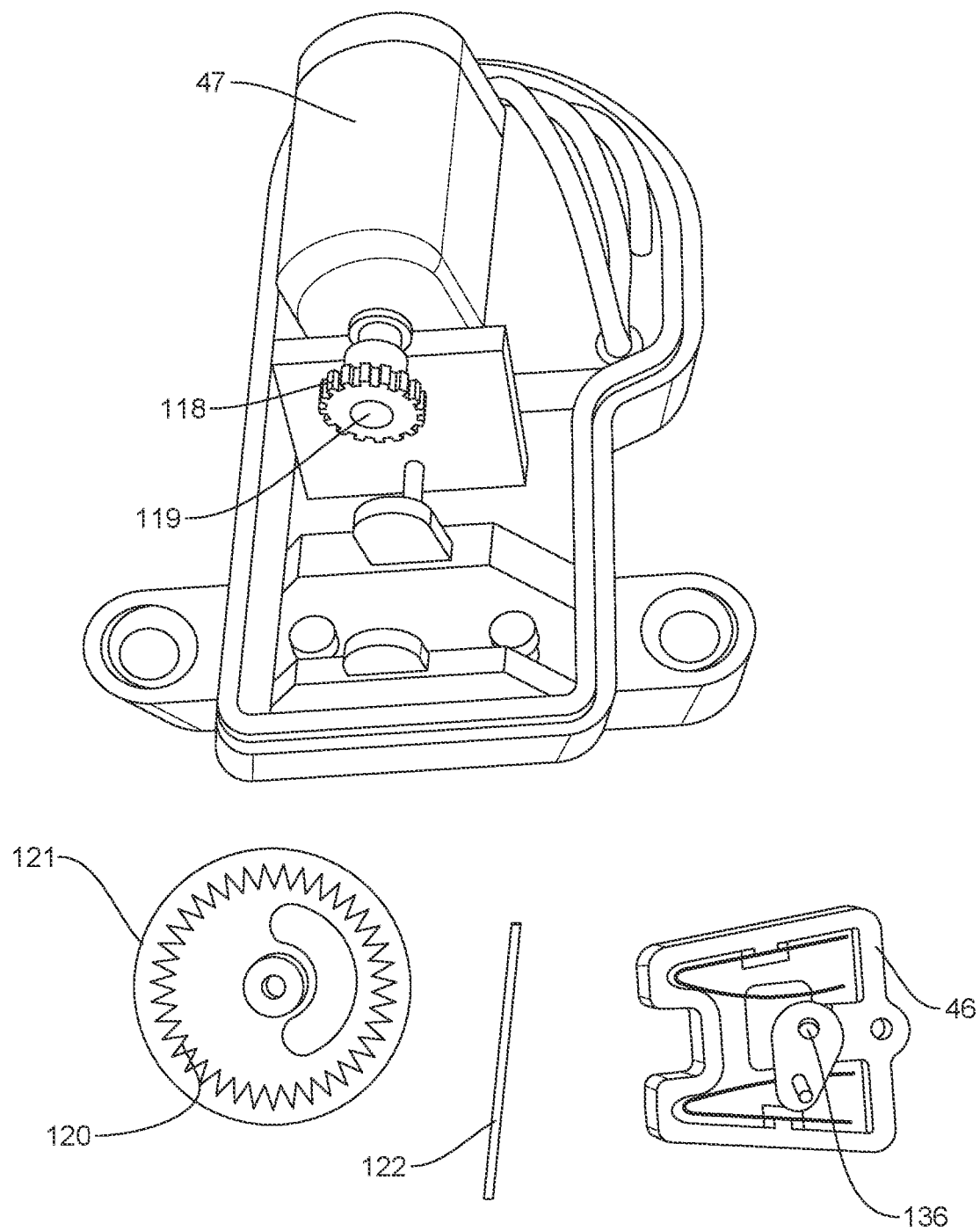
FIG. 20 is a picture of a motor and gears that comprise an electric motor driven mechanical actuation fluid pressure diverter assembly of the present invention.
Figure 21:
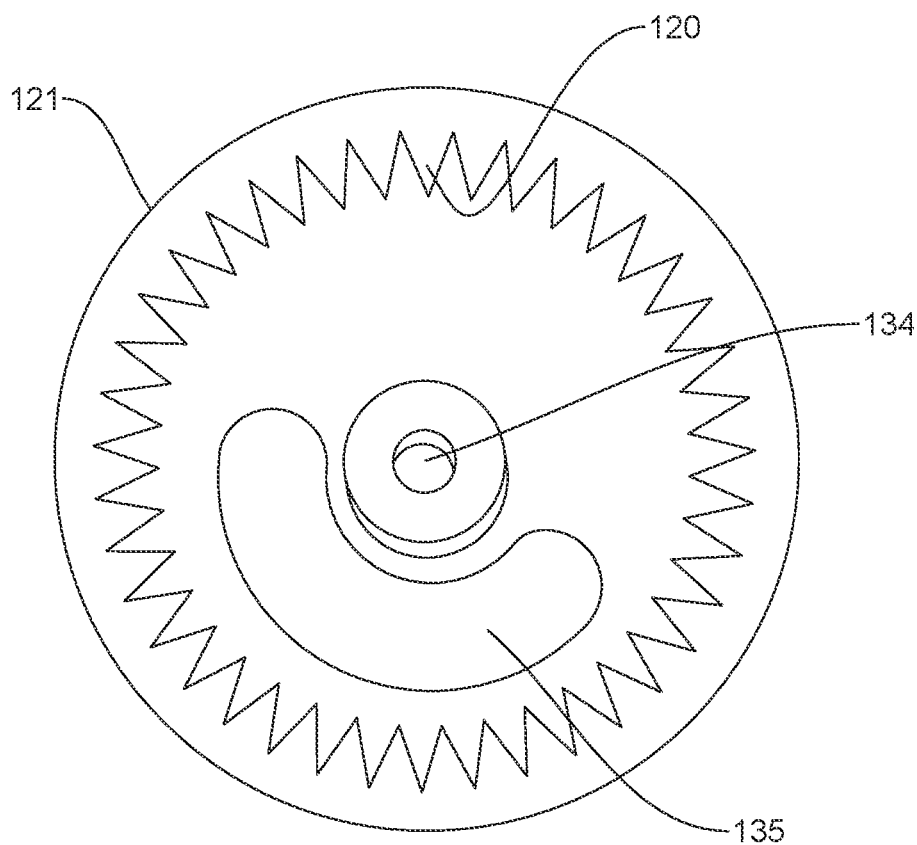
FIG. 21 is a picture of the gear of FIG. 20.

FIG. 20 is a picture of some of the EMDMA components shown unassembled. FIG. 21 is an enlarged view of a flywheel 121. When the EMDMA is assembled, a handle-arm part 136 is disposed within the diverter 46 as shown in FIG. 22.

Figure 22:
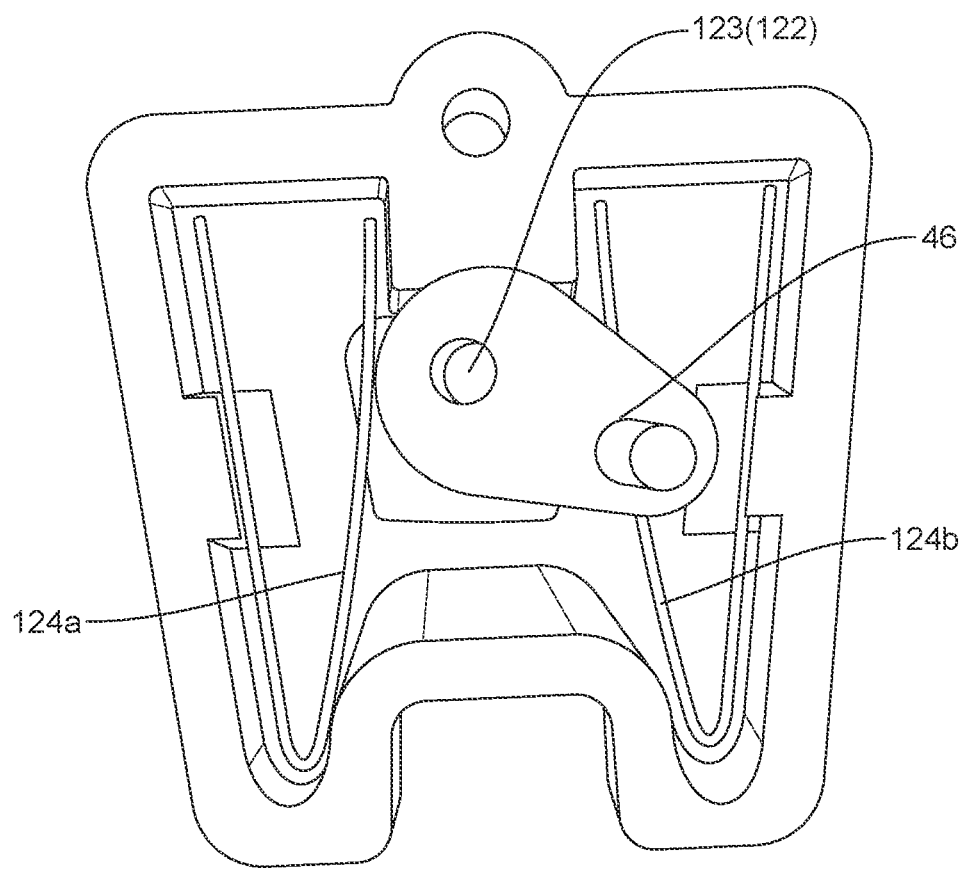
FIG. 22 is a picture of a diverter valve of FIG. 20.
Figure 36:
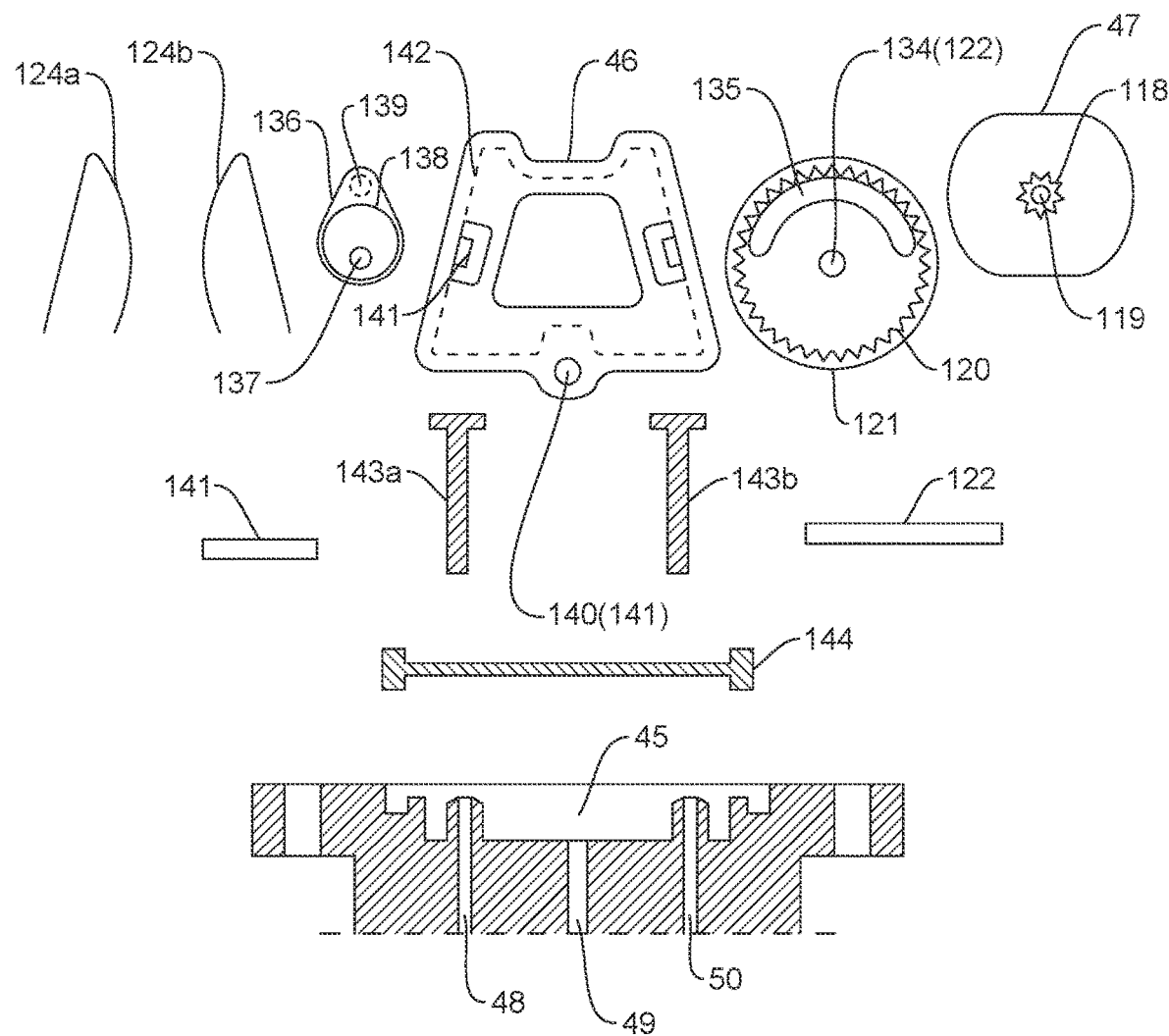
FIG. 36 is an exploded and simplified sketch of EMDMA components of the valve assembly used in the present invention.
Figure 37:
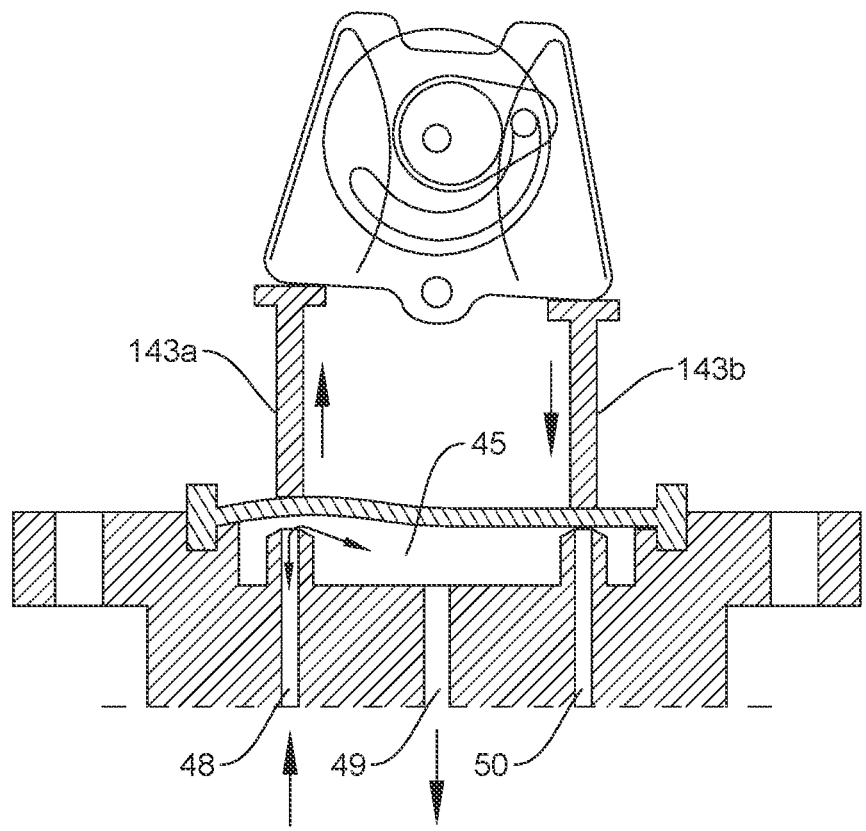
FIG. 37 is a simplified representation of the structures of FIG. 36 assembled and showing fluid flowing in a first configuration.
Figure 38:
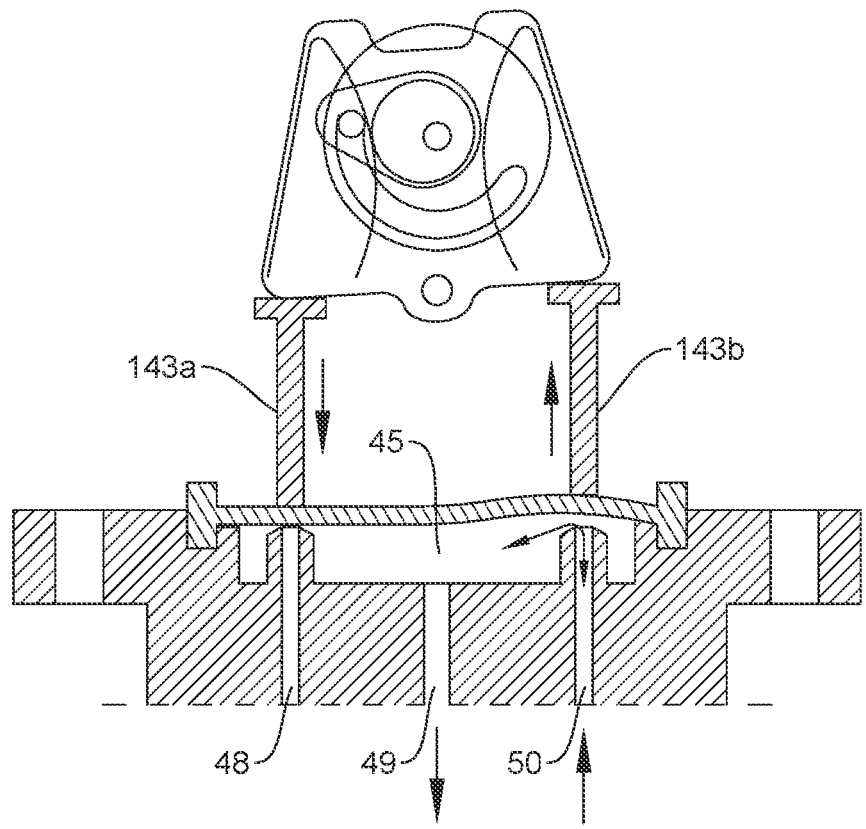
FIG. 38 is another simplified representation of the structures of FIG. 36 assembled and showing fluid flowing in a second configuration.

Furthermore, FIG. 36 is an exploded and simplified sketch of some of the EMDMA components shown in FIGS. 20-22. The upper parts are shown with hidden lines whereas the lower parts are sectional views, as these sketches best help convey the function of the valve design. Then, FIG. 37 is a simplified representation of the structures of FIG. 36 assembled and now showing fluid flowing in a first configuration. The components from the top of FIG. 36 are assembled in FIG. 37 and as shown they are positioned on top of one another as they would be aligned when assembled. Therefore, their shapes were simplified such that a better understanding of their function would be gained. The motor 47 and gearing 118 was left off in FIGS. 37 and 38 for simplicity. Likewise, FIG. 38 is another simplified representation of the structures of FIG. 36 assembled and showing the fluid flowing in a second configuration that is the opposite of the first configuration.

In reference to FIGS. 20-22 and 36-38, a DC (direct current) motor 47 has a gear 118 attached to its shaft 119, where the gear 118 engages with the inside gears 120 formed on the inside of the flywheel 121. The flywheel then rotates around a shaft 122 (center bottom of FIG. 20) about a flywheel's center 134. The flywheel also has a slot 135 formed slightly less than 180 degrees in rotation about the center 134.

Another part is called the handle-arm 136 that rotates about a hole 137. The same shaft 122 is disposed through the hole 137 when assembled as its also disposed through the flywheel center 134. The handle-arm has a circular and/or curved outside surface 138 that is not centered about the hole 137. Because the hole is not centered about the circular outside surface 138, the surface 138 acts similar to how a cam operates. An extension 139 sticks outwardly beyond the surface 138 and extends in a parallel direction to the hole 137, where the extension will be disposed within the slot 135 of the flywheel.

There are two V-shaped metal springs 124a,124b that are captured within the diverter 46 and provide a gradual and constant force to one of the two ports for creating the valve used by the present invention. The V-shaped springs are held in place by tabs 141 and the inside walls 142 of the diverter at several locations.

When assembled, the extension 139 of the handle-arm is disposed within the slot 135 of the flywheel. Thus, as the electric motor turns the flywheel, the handle-arm is forced to pivot (i.e., toggle) to the left or to the right. The V-shaped metal springs are abutting the cam surface 138. The cam surface 138 then causes the diverter to pivot about its hole 140 that has another shaft 141 rotatably connecting it to the overall base.

As shown in FIGS. 36-38, there are two plungers 143a, 143b that take the pivoting action of the diverter and transform it into an up and down movement. This is because a proximal end of the plunger abuts the diverter whereas a distal end of the plunger then presses against a resiliently flexible seal 144. The seal 144 spans across and delimits one side of the valve chamber 45. The seal is captured in place with other structures not shown.

In FIG. 37, the flywheel has rotated clockwise, which then caused the handle-arm to toggle clockwise. This causes the cam to press on the V-shaped springs to the right which pivots the diverter to the right. This in turn presses down on plunger 143b while releasing plunger 143a. Fluid is then able to flow between ports 48 and 49.

FIG. 38 is the opposite of FIG. 37. In FIG. 38, the flywheel has rotated counter-clockwise, which then caused the handle-arm to toggle counter-clockwise. This causes the cam to press on the V-shaped springs to the left which pivots the diverter to the left. This in turn presses down on plunger 143a while releasing plunger 143b. Fluid is then able to flow between ports 49 and 50.

Figure 19:
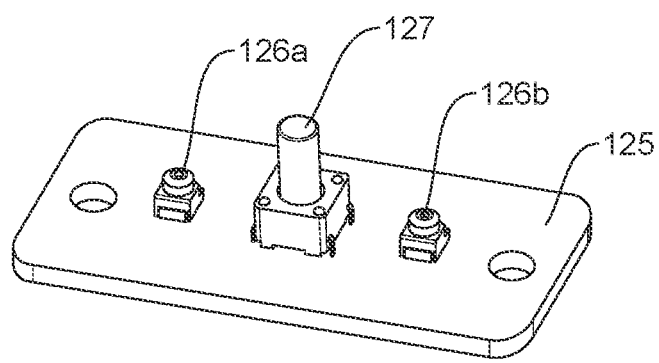
FIG. 19 is an isometric view of a user interface panel having two LEDs and a push button.

FIG. 19 shows an electrical board 125 with two LEDs 126 and a switch 127 on top of the actuating device. The switch is used for manual operation of the valve and also communication for onboarding and setup. The two multicolor LEDs, individually or in combination, indicate a host of information such as status of the valve (ON/OFF), power, communication, notifications, etc. As can be appreciated, the cover protects the switch, LEDs and all associated electronics within, such that rodents cannot interfere with their operation. The user facing LEDs are able to notifier a user of the valve status, device health status and/or the battery status, along with other relevant information such as Wi-Fi connectivity.

Figure 35:
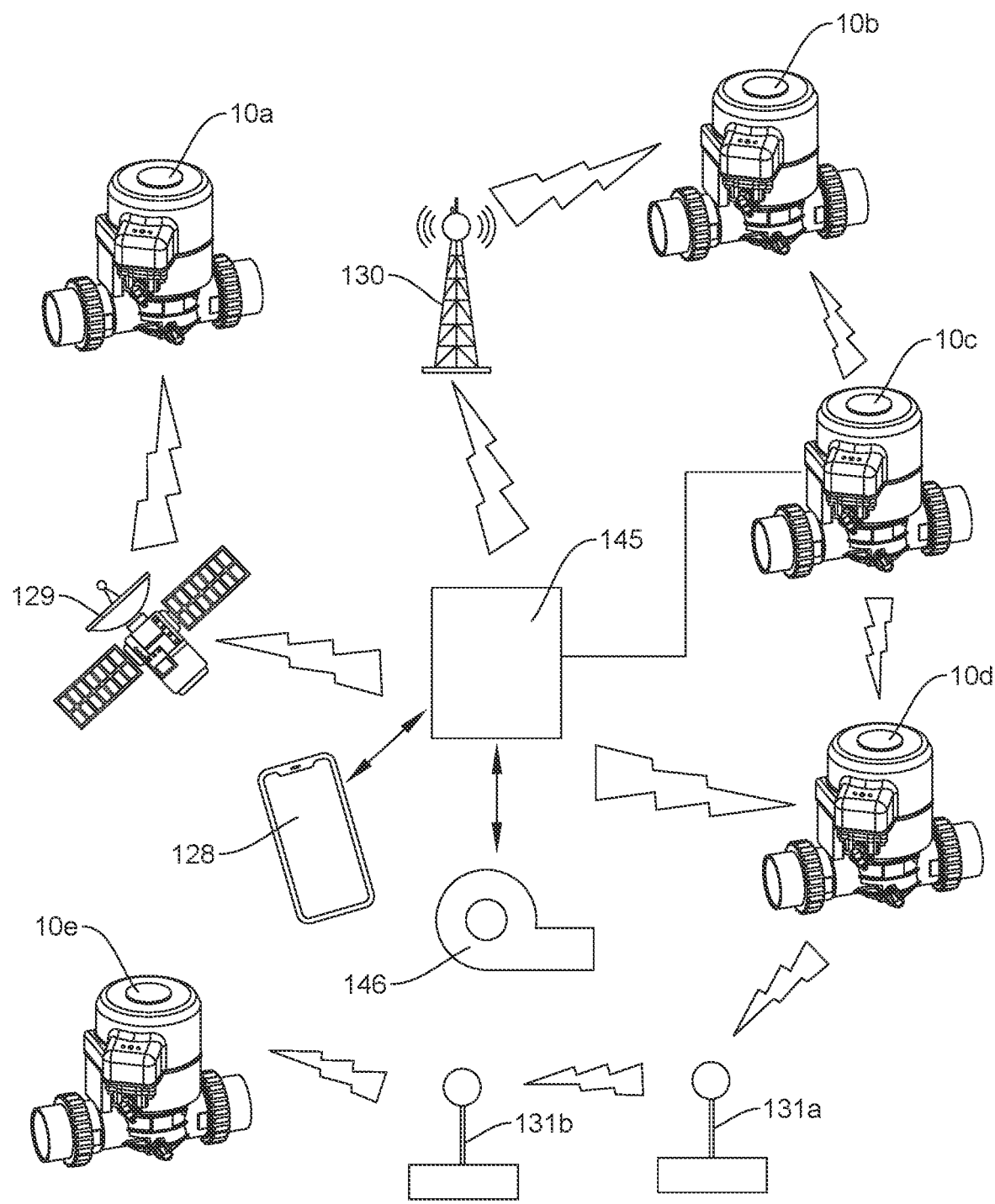
FIG. 35 is a simplified graphic illustrating numerous ways the water control device of the present invention may be controlled.

As shown in FIG. 35, the water control device 10(a, b, c . . . ) can be remotely controlled from a user interface 128. The user interface 128 may be a computer, a touch computer screen, a screen, a keyboard and/or a smart device such a mobile telephone. Here, the user interface is depicted as a smart phone. The user interface 128 is communicating with a base unit 145 and then the base unit communicates with each individual water control device through a peer-to-peer mesh communication network. It is noteworthy that as long as one water control device is in connection with base unit all water control devices are connected and can report and obtain information through the mesh network. The base unit would have its own transmitter and receiver. Accordingly, a plurality of water control devices 10a-10e can be controlled from the user interface. For example, the user interface can control water control device 10a with the use a satellite 129. User interface can control water control device 10b through the use a cellular tower 130 using Wi-Fi, the Internet or the like. The base unit is then able to report activity for any or all of the water control devices and also is available to receive a new watering schedule and push it out to all the water control devices. A new watering schedule can be changed over time due to changes in weather conditions, changes in soil moisture, or changes in water needs based off of analyzing the crops being produced. The present invention allows flexibility to account for all of these changes and more. For example, if the flow rate of any one water control device is too low, it could indicate a clog in the system that needs investigating. If the flow rate of any one water control device is too fast, it could indicate a rupture has occurred and again needs investigating. The present invention provides all of this capability and more.

Each device 10 may have an antenna and receiver, that may be internal and/or external, so they could communicate with another or the base unit. For example, devices 10b, 10c and 10d are depicted as being capable of communication with one another. Device 10c is also hardwired to the base unit 145 or could have electrical power hardwired in addition to the battery. Water control device 10d may communicate directly with the base unit through a connection such as Bluetooth. Likewise, Bluetooth could be used to communicate between the user interface and the base unit.

Additionally, relay units 131a and 131b may be used to provide instructions to a device 10e that may be out of range of traditional wireless communication methods. These relay units would have their own power source, such as batteries and or solar panels, so that maintenance and servicing would not be needed for a long time in the field.

If connection is lost, the water control devices 10 can be configured to operate automatically. This is because the devices 10 are primarily battery operated and could have additional power provided from solar panels, battery packs or direct line power.

The base unit is also configured to communicate with a pump and third-party device control 146, as this is very important in providing an overall solution for the agricultural industry. Residences typically have plumbing supplied with water pressure from municipalities. This is not possible in agriculture where there are no municipalities in range to provide water. Rather, the agricultural industry is dependent upon well water or other sources of water that are mechanically pumped. Thus, one or a plurality of pumps are used to provide water to the water control devices of the present invention.

Many times in prior art agriculture these pumps can be mistakenly left on or left off which can then cause a wide range of problems. The present invention uses the onboard flow sensors or third-party pressure sensors that enable smart control with the base unit 145. The base unit can then communicate with the pump control 146 to automatically turn on and off the pumps or adjust the pump motor speed when needed. This provides accountability such that the pumps are always turned on and off and provide the desired water flow/pressure when needed and not left to manual labor which may make mistakes.

All water control devices in a system can be configured to enter a sleep period simultaneously where it reduces power consumption for a (software configurable) set period of time, such as 2 minutes. All devices can then simultaneously wake up, search for incoming signals, communicate with each other and base unit and then turn back off to save power. This cycle can then keep repeating itself. This is done such that battery power is limited thus extending the range of the device in the field.

Referring to FIG. 5, there are shown optional plug nuts 147 that are sealing additional ports 148. These can be threaded at ¼ NPT for example and allow additional functionality to the water control device, such as attachment of pressure sensors, addition of fertilizers or plant food feeds, or even adding other water/gas supply extension/outlets. As will be understood by those skilled in the art, these additional ports can be used for a wide variety of devices and functionality.

Although several embodiments have been described in detail for purposes of illustration, various modifications may be made to each without departing from the scope and spirit of the invention. Accordingly, the invention is not to be limited, except as by the appended claims.

NUMERALS 1 traditional diaphragm valve
2 diaphragm
3 compression spring
4 fluid
5 opening
6 solenoid
7 port
8 port
9 - - -
10 water control device
11 valve pipe section
12 fluid and/or a gas
13 fluid inlet
14 fluid outlet
15 lower diaphragm valve housing
16 fluid aperture
17 inlet portion
18 outlet portion
19 lower internal space
20 lower flange
21 diaphragm opening
22 upper diaphragm valve housing
23 upper internal space
24 upper flange
25 extension 26 adjustment screw opening
27 flange seal
28 internally disposed screw thread
29 externally disposed screw thread
30 diaphragm valve assembly
31 flexibly resilient diaphragm
32 fluid aperture seal
33 periphery
34 flow adjustment screw
35 longitudinally along a length
36 distal end
37 proximal end
38 outside surface
39 externally disposed screw thread,
40 flow adjustment screw seal
41 non-circular end
42 portion
43 compression spring
44 electric motor driven mechanical actuation fluid pressure diverter assembly
45 valve chamber
46 diverter valve
47 electric motor
48 first port
49 second port
50 third port
51 first position
52 second position
53 first fluidic connection
54 external atmosphere
55 second fluidic connection
56 third fluidic connection
57 control assembly
58 base structure
59 cover
60 interior space
61 base hole
62 cover hole
63 cover hole flange
64 cover nut
65 internally disposed screw thread
66 least one protrusion
67 at least one recess
68 flow regulation knob
69 non-circular recess
70a tamper proof surface
70b second tamper proof surface
71 a first plurality of protrusions and/or recesses
72 flow adjustment tool
73 a second plurality of recesses and/or protrusions
74 top
75 cover recess
76 top cover aperture
77 cover cap
78 flow turbine assembly
79 shaft
80 magnet
81 Hall Effect sensor
82 battery
83 electronic circuit board
84 transmitter
85 receiver
86 toggle arm
87 external (male) screw thread
88 outside circumferential surface
89 inlet-side nut
90 internal (female) screw thread
91 inside circumferential surface
92 external (male) screw thread
93 outside circumferential surface
94 outlet-side nut
95 internal (female) screw thread
96 inside circumferential surface
97 first pipe stub
98 first end
99 flanged end
100 first pipe section
101 inlet-side O-ring and/or annular seal
102 first annular cavity
103 second pipe stub
104 first end
105 flanged end
106 second pipe section
107 outlet-side O-ring and/or annular seal
108 second annular cavity
109 annular channel, flow adjustment screw
110 seal, control assembly
111 flow turbine
112 turbine housing
113 turbine bearing
114 turbine cone
115 handle
116 proximal end, non-circular, flow adjustment tool
117 recess, non-circular, handle
118 gear
119 motor shaft
120 gears of flywheel
121 flywheel
122 shaft
123 - - -
124 metal springs
125 electrical board
126 LEDs
127 switch
128 user interface
129 satellite
130 cellular tower
131 relay unit
132 sensor, diverter valve
133 tabs, flow adjustment tool
134 center, flywheel
135 slot, flywheel
136 handle-arm part
137 hole, handle-arm part
138 circular or curved outside surface, handle-arm part
139 extension, handle-arm part
140 hole
141 tabs, diverter
142 inside walls, diverter
143 plungers
144 seal
145 base unit
146 pump and other third-party devices control
147 plug nuts
148 port

What is claimed is:
1. A water control device configured for agricultural irrigation, the water control device comprising:
a valve pipe section configured for the transportation of a fluid and/or a gas;
wherein the valve pipe section comprises a fluid inlet opposite a fluid outlet;

wherein the valve pipe section comprises a lower diaphragm valve housing disposed between the fluid inlet and the fluid outlet;

wherein the valve pipe section comprises an internally disposed fluid aperture;

wherein the fluid inlet and fluid outlet are in fluidic communication when the fluid aperture is not blocked and wherein the fluid inlet and fluid outlet are not in fluidic communication when the fluid aperture is blocked;

wherein the fluid aperture is defined as separating an inlet portion associated with the fluid inlet from an outlet portion associated with the fluid outlet;

wherein the lower diaphragm valve housing comprises a lower internal space with a lower flange delimiting a diaphragm opening, wherein the lower internal space is disposed in the outlet portion;

an upper diaphragm valve housing defining an upper internal space, the upper internal space disposed between an upper flange opposite an extension, the extension having an adjustment screw opening;

wherein the upper flange and lower flange are configured to be attached to one another and fluidically seal to one another through the use of a flange seal;

wherein at least a portion of the extension has an internally disposed screw thread;

wherein at least a portion of the extension has an externally disposed screw thread;

a diaphragm valve assembly disposed at least partially in the lower internal space and/or the upper internal space;

wherein the diaphragm valve assembly comprises a flexibly resilient diaphragm connected to a fluid aperture seal;

wherein the flexibly resilient diaphragm is captured at a periphery between the lower flange and the upper flange;

wherein the fluid aperture seal is configured to seal and unseal the fluid aperture dependent upon position of the fluid aperture seal;

wherein the diaphragm valve assembly when installed between the lower flange and the upper flange fluidically seals and separates the upper internal space from the lower internal space;

a flow adjustment screw extending longitudinally along a length from a distal end to a proximal end;

wherein at least a portion of an outside surface of the flow adjustment screw has an externally disposed screw thread, wherein the externally disposed screw thread of the flow adjustment screw is configured to threadably engage with the internally disposed screw thread of the flow adjustment screw opening of the upper diaphragm valve housing;

wherein a flow adjustment screw seal is disposed between the flow adjustment screw and the extension of the upper diaphragm valve housing;

wherein the proximal end of the flow adjustment screw comprises a non-circular end configured to be non-rotatably engaged;

wherein the distal end of the flow adjustment screw is configured to abut at least a portion of the diaphragm valve assembly when the diaphragm assembly is opened to allow the gas and/or fluid to flow past the fluid aperture, wherein rotation of the flow adjustment screw moves its distal end closer to or father away from the diaphragm valve assembly when opened allowing control over a flow rate of the water control device;

an electric motor driven mechanical actuation fluid pressure diverter assembly comprising a valve chamber and a diverter valve mechanically driven by an electric motor;

wherein the valve chamber comprises a first port, a second port and a third port;

wherein the diverter valve is configured to move between a first position and a second position by the electric motor;

wherein the diverter valve in the first position fluidically seals the first port and allows fluidic communication through the valve chamber between the second port and the third port;

wherein the diverter valve in the second position fluidically seals the third port and allows fluidic communication through the valve chamber between the second port and the first port;

a first fluidic connection between the first port of the valve chamber and an external atmosphere;

a second fluidic connection between the second port of the valve chamber and the upper internal space of the upper diaphragm valve housing; and a third fluidic connection between the valve chamber and the inlet portion of the valve pipe section.

2. The water control device of claim 1, including a control assembly configured to be removably mounted to the upper diaphragm valve housing, wherein the control assembly comprises a base structure and a cover, wherein the cover is configured to be disposed on top of the base structure forming an interior space therebetween.

3. The water control device of claim 2, wherein the electric motor driven mechanical actuation fluid pressure diverter assembly is mounted to or formed as part of the base structure.

4. The water control device of claim 2, wherein the base structure has a base hole and the cover has a cover hole, wherein when the control assembly is mounted to the upper diaphragm valve housing at least a part of the extension of the upper diaphragm valve housing extends through the base hole and the cover hole where the externally disposed screw thread of the extension at least partially extends past the cover hole.

5. The water control device of claim 4, wherein the cover hole is delimited by a cover hole flange, and including a cover nut having an internally disposed screw thread configured to threadably engage with the externally disposed screw thread of the extension, wherein the cover nut is configured to abut the cover hole flange and threadably engaged with the extension securing the cover to the base structure and in turn securing the base structure to the upper diaphragm valve housing.

6. The water control device of claim 5, wherein the base hole of the base structure is configured to engage the extension non-rotatably.

7. The water control device of claim 6, wherein the extension comprises at least one protrusion that non-rotatably engages with at least one recess formed in the base hole.

8. The water control device of claim 5, including a flow regulation knob having a non-circular recess configured to non-rotatably engage with the non-circular end of the flow adjustment screw.

9. The water control device of claim 8, wherein the non-circular end and non-circular recess are rectangular shaped, square shaped or triangular shaped.

10. The water control device of claim 8, wherein flow regulation knob comprises a tamper proof surface comprising a first plurality of protrusions and/or recesses configured to be non-rotatably engaged by a separately disposed flow adjustment tool comprising a second plurality of recesses and/or protrusions.

11. The water control device of claim 10, wherein the cover nut comprises a second tamper proof surface similar in shape to the tamper proof surface of the flow regulation knob.

12. The water control device of claim 11, wherein the cover hole flange is disposed recessed from a top of the cover forming a cover recess having a top cover aperture located the top of the cover and including a cover cap attached to the top cover aperture.

13. The water control device of claim 12, wherein the flow regulation knob and the cover nut are configured to be disposed within the cover recess and located between the cover hole flange and the top of the cover.

14. The water control device of claim 2, including a flow turbine assembly removably disposed within the inlet portion, the flow turbine assembly having a flow turbine configured to rotate about a shaft when the fluid and/or the gas flows through the valve pipe section, wherein the flow turbine has at least one magnet.

15. The water control device of claim 14, including a Hall Effect sensor disposed in close proximity to the at least one magnet, wherein the Hall Effect sensor is located within the control assembly.

16. The water control device of claim 2, wherein the control assembly includes a battery powering an electronic circuit board, the electronic circuit board configured to control the electric motor, and wherein the electronic circuit board includes a wireless connection being a transmitter and a receiver configured to send and receive over Wi-Fi, Bluetooth, Satellite, or Cellular communications.

17. The water control device of claim 1, wherein the electric motor driven mechanical actuation fluid pressure diverter assembly does not comprise a solenoid and does not comprise an electromagnetic actuation.

18. The water control device of claim 1, wherein the diverter valve comprises a toggle arm configured to pivot between the first position and the second position.

19. The water control device of claim 1, wherein the fluid inlet of the valve pipe section comprises an external (male) screw thread formed on an outside circumferential surface.

20. The water control device of claim 19, including an inlet-side nut comprising an internal (female) screw thread formed on an inside circumferential surface of the inlet-side nut.

21. The water control device of claim 20, wherein the fluid outlet of the valve pipe section comprises an external (male) screw thread formed on an outside circumferential surface.

22. The water control device of claim 21, including an outlet-side nut comprising an internal (female) screw thread formed on an inside circumferential surface of the outlet-side nut.

23. The water control device of claim 22, including a first pipe stub configured for the transportation of the fluid and/or the gas defining a first end opposite a flanged end, wherein the inlet-side nut is configured to be disposed around the first pipe stub, wherein the first end of the first pipe stud is configured to be permanently attached to a first pipe section, wherein the flanged end is configured to attach to the fluid inlet of the valve pipe section by the inlet-side nut abutting the flanged end of the first pipe stub when the internal screw threads of the inlet-side nut threadably engages with the external screw threads of fluid inlet of the valve pipe section, and wherein the first pipe stub is fluidically sealed to the fluid inlet of the valve pipe section by an inlet-side annular seal disposed therebetween.

24. The water control device of claim 23, wherein the inlet-side annular seal is at least partially disposed within a first annular cavity formed in the fluid inlet of the valve pipe section.

25. The water control device of claim 24, including a second pipe stub configured for the transportation of the fluid and/or the gas defining a first end opposite a flanged end, wherein the outlet-side nut is configured to be disposed around the second pipe stub, wherein the first end of the second pipe stud is configured to be permanently attached to a second pipe section, wherein the flanged end is configured to attach to the fluid outlet of the valve pipe section by the outlet-side nut abutting the flanged end of the second pipe stub when the internal screw threads of the outlet-side nut threadably engages with the external screw threads of fluid outlet of the valve pipe section, and wherein the second pipe stub is fluidically sealed to the fluid outlet of the valve pipe section by an outlet-side annular seal disposed therebetween.

26. The water control device of claim 25, wherein the outlet-side annular seal is at least partially disposed within a second annular cavity formed in the fluid outlet of the valve pipe section.

27. The water control device of claim 1, wherein the fluid inlet, the fluid outlet, the lower diaphragm valve housing, the fluid aperture and the lower flange of the valve pipe section are integrally formed as a single part from either a plastic injection molding process or a metal casting process.

28. The water control device of claim 1, including a compression spring biased and disposed between the diaphragm valve assembly and the upper diaphragm valve housing.

29. A water control device configured for agricultural irrigation, the water control device comprising:
  a valve pipe section configured for the transportation of a fluid and/or a gas;
    wherein the valve pipe section comprises a fluid inlet opposite a fluid outlet;
    wherein the valve pipe section comprises a lower diaphragm valve housing disposed between the fluid inlet and the fluid outlet;
    wherein the valve pipe section comprises an internally disposed fluid aperture;
    wherein the fluid inlet and fluid outlet are in fluidic communication when the fluid aperture is not blocked and wherein the fluid inlet and fluid outlet are not in fluidic communication when the fluid aperture is blocked;
    wherein the fluid aperture is defined as separating an inlet portion associated with the fluid inlet from an outlet portion associated with the fluid outlet;
    wherein the lower diaphragm valve housing comprises a lower internal space with a lower flange delimiting a diaphragm opening, wherein the lower internal space is disposed in the outlet portion;
    wherein the fluid inlet, the fluid outlet, the lower diaphragm valve housing, the fluid aperture and the lower flange of the valve pipe section are integrally formed as a single part from either a plastic injection molding process or a metal casting process;
  an upper diaphragm valve housing defining an upper internal space, the upper internal space disposed between an upper flange opposite an extension, the extension having an adjustment screw opening;
  wherein the upper flange and lower flange are configured to be attached to one another and fluidically seal to one another through the use of a flange seal;
  wherein at least a portion of the extension has an internally disposed screw thread;
  wherein at least a portion of the extension has an externally disposed screw thread;
a diaphragm valve assembly disposed at least partially in the lower internal space and/or the upper internal space;
  wherein the diaphragm valve assembly comprises a flexibly resilient diaphragm connected to a fluid aperture seal;
  wherein the flexibly resilient diaphragm is captured at a periphery between the lower flange and the upper flange;
  wherein the fluid aperture seal is configured to seal and unseal the fluid aperture dependent upon position of the fluid aperture seal;
  wherein the diaphragm valve assembly when installed between the lower flange and the upper flange fluidically seals and separates the upper internal space from the lower internal space;
a flow adjustment screw extending longitudinally along a length from a distal end to a proximal end;
  wherein at least a portion of an outside surface of the flow adjustment screw has an externally disposed screw thread, wherein the externally disposed screw thread of the flow adjustment screw is configured to threadably engage with the internally disposed screw thread of the flow adjustment screw opening of the upper diaphragm valve housing;
  wherein a flow adjustment screw seal is disposed between the flow adjustment screw and the extension of the upper diaphragm valve housing;
  wherein the proximal end of the flow adjustment screw comprises a non-circular end configured to be non-rotatably engaged;
  wherein the distal end of the flow adjustment screw is configured to abut at least a portion of the diaphragm valve assembly when the diaphragm assembly is opened to allow the gas and/or fluid to flow past the fluid aperture, wherein rotation of the flow adjustment screw moves its distal end closer to or father away from the diaphragm valve assembly when opened allowing control over a flow rate of the water control device;
a compression spring biased and disposed between the diaphragm valve assembly and the upper diaphragm valve housing;
an electric motor driven mechanical actuation fluid pressure diverter assembly comprising a valve chamber and a diverter valve mechanically driven by an electric motor;
  wherein the valve chamber comprises a first port, a second port and a third port;
  wherein the diverter valve is configured to move between a first position and a second position by the electric motor;
  wherein the diverter valve in the first position fluidically seals the first port and allows fluidic communication through the valve chamber between the second port and the third port;
  wherein the diverter valve in the second position fluidically seals the third port and allows fluidic communication through the valve chamber between the second port and the first port;
a first fluidic connection between the first port of the valve chamber and an external atmosphere;
a second fluidic connection between the second port of the valve chamber and the upper internal space of the upper diaphragm valve housing;
a third fluidic connection between the valve chamber and the inlet portion of the valve pipe section;
a control assembly configured to be removably mounted to the upper diaphragm valve housing, wherein the control assembly comprises a base structure and a cover, wherein the cover is configured to be disposed on top of the base structure forming an interior space therebetween;
wherein the electric motor driven mechanical actuation fluid pressure diverter assembly is mounted to or formed as part of the base structure;
a flow turbine assembly removably disposed within the inlet portion, the flow turbine assembly having a flow turbine configured to rotate about a shaft when the fluid and/or the gas flows through the valve pipe section, wherein the flow turbine has at least one magnet; and
a Hall Effect sensor disposed in close proximity to the at least one magnet, wherein the Hall Effect sensor is located within the control assembly.

30. A water control device configured for agricultural irrigation, the water control device comprising:
a valve pipe section configured for the transportation of a fluid and/or a gas;
  wherein the valve pipe section comprises a fluid inlet opposite a fluid outlet;
  wherein the valve pipe section comprises a lower diaphragm valve housing disposed between the fluid inlet and the fluid outlet;
  wherein the valve pipe section comprises an internally disposed fluid aperture;
  wherein the fluid inlet and fluid outlet are in fluidic communication when the fluid aperture is not blocked and wherein the fluid inlet and fluid outlet are not in fluidic communication when the fluid aperture is blocked;
  wherein the fluid aperture is defined as separating an inlet portion associated with the fluid inlet from an outlet portion associated with the fluid outlet;
  wherein the lower diaphragm valve housing comprises a lower internal space with a lower flange delimiting a diaphragm opening,
  wherein the lower internal space is disposed in the outlet portion;
an upper diaphragm valve housing defining an upper internal space, the upper internal space disposed between an upper flange opposite an extension wherein the upper flange and lower flange are configured to be attached to one another and fluidically seal to one another through the use of a flange seal;
a diaphragm valve assembly disposed at least partially in the lower internal space and/or the upper internal space;
  wherein the diaphragm valve assembly comprises a flexibly resilient diaphragm connected to a fluid aperture seal;
  wherein the flexibly resilient diaphragm is captured at a periphery between the lower flange and the upper flange;
  wherein the fluid aperture seal is configured to seal and unseal the fluid aperture dependent upon position of the fluid aperture seal;

wherein the diaphragm valve assembly when installed between the lower flange and the upper flange fluidically seals and separates the upper internal space from the lower internal space;

an electric motor driven mechanical actuation fluid pressure diverter assembly comprising a valve chamber and a diverter valve mechanically driven by an electric motor;

wherein the valve chamber comprises a first port, a second port and a third port;

wherein the diverter valve is configured to move between a first position and a second position by the electric motor;

wherein the diverter valve in the first position fluidically seals the first port and allows fluidic communication through the valve chamber between the second port and the third port;

wherein the diverter valve in the second position fluidically seals the third port and allows fluidic communication through the valve chamber between the second port and the first port;

a first fluidic connection between the first port of the valve chamber and an external atmosphere;

a second fluidic connection between the second port of the valve chamber and the upper internal space of the upper diaphragm valve housing; and a third fluidic connection between the valve chamber and the inlet portion of the valve pipe section.

\* \* \* \* \*

UNITED STATES PATENT AND TRADEMARK OFFICE
CERTIFICATE OF CORRECTION

| | |
|---|---|
| PATENT NO. | : 12,029,172 B1 |
| APPLICATION NO. | : 18/404894 |
| DATED | : July 9, 2024 |
| INVENTOR(S) | : Henry M. Halimi |

It is certified that error appears in the above-identified patent and that said Letters Patent is hereby corrected as shown below:

In the Claims

Column 17, Claim 15, Line 28, "senser" should read --sensor--.

Column 20, Claim 30, Line 53, "extension" should read --extension,--.

Signed and Sealed this
Twenty-fourth Day of September, 2024

Katherine Kelly Vidal
*Director of the United States Patent and Trademark Office*